US012640375B2

(12) United States Patent
Kawamura et al.

(10) Patent No.: US 12,640,375 B2
(45) Date of Patent: May 26, 2026

(54) SURFACE-TREATED SHEET FOR ALKALINE SECONDARY BATTERY AND METHOD FOR MANUFACTURING SAME

(71) Applicant: TOYO KOHAN CO., LTD., Tokyo (JP)

(72) Inventors: Michio Kawamura, Kudamatsu (JP); Shinichiro Horie, Kudamatsu (JP); Etsuro Tsutsumi, Kudamatsu (JP); Koh Yoshioka, Kudamatsu (JP)

(73) Assignee: TOYO KOHAN CO., LTD., Tokyo (JP)

( * ) Notice: Subject to any disclaimer, the term of this patent is extended or adjusted under 35 U.S.C. 154(b) by 858 days.

(21) Appl. No.: 17/442,441

(22) PCT Filed: Mar. 30, 2020

(86) PCT No.: PCT/JP2020/014722
§ 371 (c)(1),
(2) Date: Sep. 23, 2021

(87) PCT Pub. No.: WO2020/204018
PCT Pub. Date: Oct. 8, 2020

(65) Prior Publication Data
US 2022/0209243 A1 Jun. 30, 2022

(30) Foreign Application Priority Data

| | | |
|---|---|---|
| Mar. 29, 2019 | (JP) | 2019-069378 |
| Mar. 28, 2020 | (JP) | 2020-059220 |
| Mar. 28, 2020 | (JP) | 2020-059222 |

(51) Int. Cl.
*H01M 4/66* (2006.01)
*C25D 5/12* (2006.01)
(Continued)

(52) U.S. Cl.
CPC .............. *H01M 4/667* (2013.01); *C25D 5/12* (2013.01); *C25D 5/50* (2013.01); *C25D 7/00* (2013.01); *H01M 4/662* (2013.01); *H01M 10/30* (2013.01)

(58) Field of Classification Search
None
See application file for complete search history.

(56) References Cited

U.S. PATENT DOCUMENTS

| | | | |
|---|---|---|---|
| 11,375,624 B2 * | 6/2022 | Miyamoto | H05K 3/022 |
| 2004/0058189 A1 * | 3/2004 | Hodgens | C23C 10/60 |
| | | | 428/941 |

(Continued)

FOREIGN PATENT DOCUMENTS

| | | |
|---|---|---|
| CN | 1497065 A | 5/2004 |
| CN | 101662012 A | 3/2010 |

(Continued)

OTHER PUBLICATIONS

Notice of Reasons for Rejection issued Feb. 22, 2022 in Japanese Patent Application No. 2021-034479, with English translation.

*Primary Examiner* — Kevin M Bernatz

(74) *Attorney, Agent, or Firm* — FisherBroyles, LLP; Roger L. Browdy; James E. Mrose

(57) ABSTRACT

The present invention has as its object the provision of a surface-treated sheet for an alkaline secondary battery, which has gas evolution suppressing effect and also has resistance to an alkaline electrolyte solution. A surface-treated sheet 100 of the present invention for an alkaline secondary battery has a base material 10, and a metal layer 20 formed on at least one side of the base material 10. The metal layer 20 includes an alloy layer 20M that contains Ni and Zn, the alloy layer includes a first region 20A in which a proportion of Ni is 60% to 85% based on a total content (Continued)

of Ni and Zn, and the first region 20A has a thickness of 0.15 μm or greater.

20 Claims, 10 Drawing Sheets

(51) Int. Cl.

| | | |
|---|---|---|
| *C25D 5/50* | (2006.01) | |
| *C25D 7/00* | (2006.01) | |
| *H01M 10/30* | (2006.01) | |

(56) References Cited

U.S. PATENT DOCUMENTS

| | | | | |
|---|---|---|---|---|
| 2005/0058848 | A1 | 3/2005 | Hodgens et al. | |
| 2009/0233159 | A1* | 9/2009 | Phillips ............. | H01M 50/1243 |
| | | | | 429/82 |
| 2010/0092857 | A1* | 4/2010 | Phillips ............. | H01M 10/0431 |
| | | | | 429/231 |
| 2012/0171535 | A1* | 7/2012 | Ma ...................... | H01M 50/538 |
| | | | | 29/623.2 |
| 2023/0343968 | A1* | 10/2023 | Brewer ............. | H01M 10/0525 |
| 2024/0372109 | A1* | 11/2024 | Kawamura ........... | H01M 4/661 |

FOREIGN PATENT DOCUMENTS

| | | | |
|---|---|---|---|
| JP | 51094426 | U | 7/1976 |
| JP | 02011790 | A | 1/1990 |
| JP | 1990-075160 | A | 3/1990 |
| JP | 1991-004449 | A | 1/1991 |
| JP | 031495 | A | 2/1991 |
| JP | 11-233117 | A | 8/1999 |
| JP | 2004-156078 | A | 6/2004 |
| JP | 2011222125 | A | 11/2011 |
| JP | 2018160387 | A | 10/2018 |
| WO | 98-53512 | A1 | 11/1998 |

* cited by examiner

[FIG. 1]
100
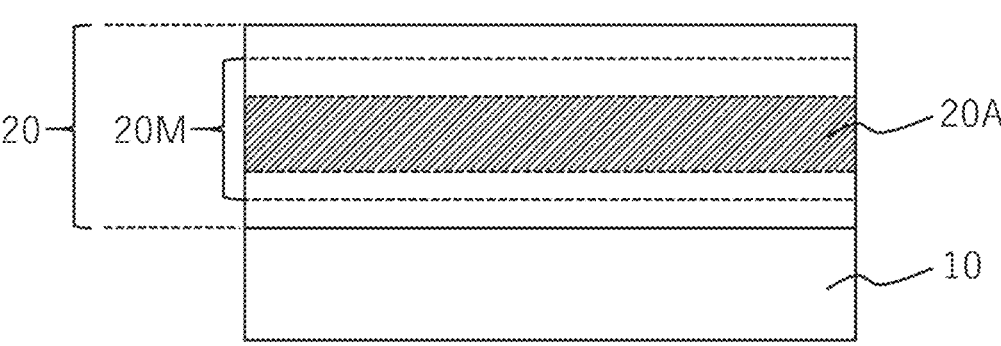
20 — 20M — 20A
10
[FIG. 2]
200
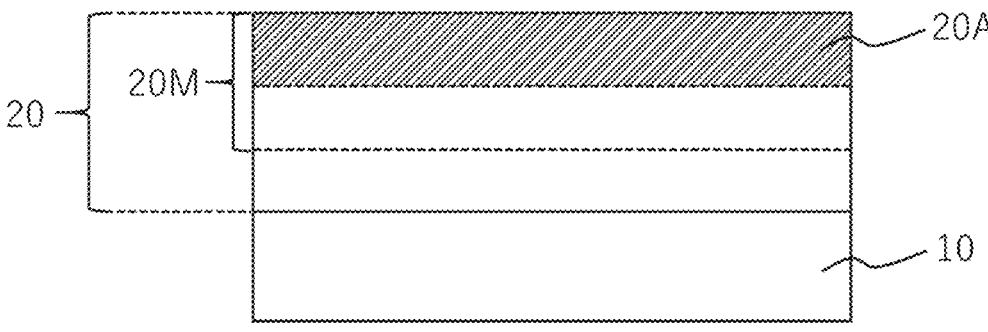
20 — 20M — 20A
10

[FIG. 3A]
300
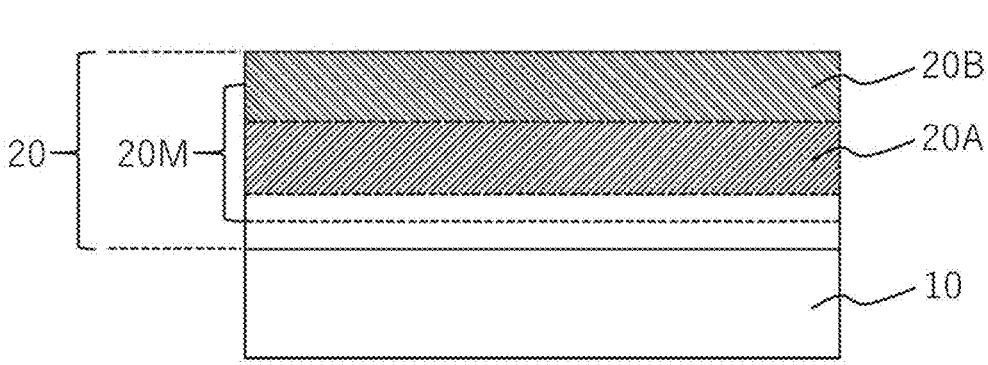
[FIG. 3B]
300
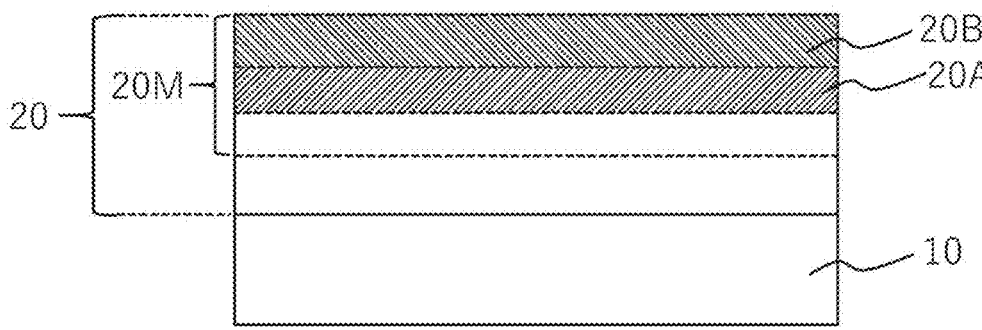

[FIG. 4A]
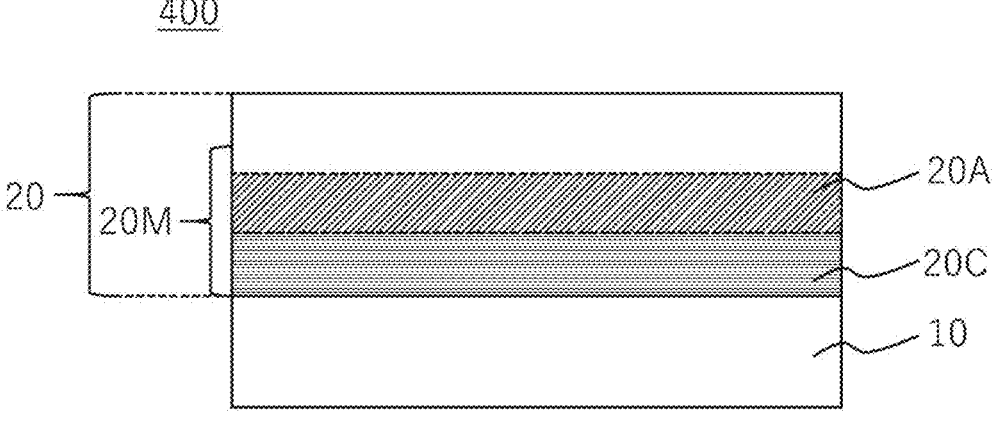
[FIG. 4B]

[FIG. 5A]
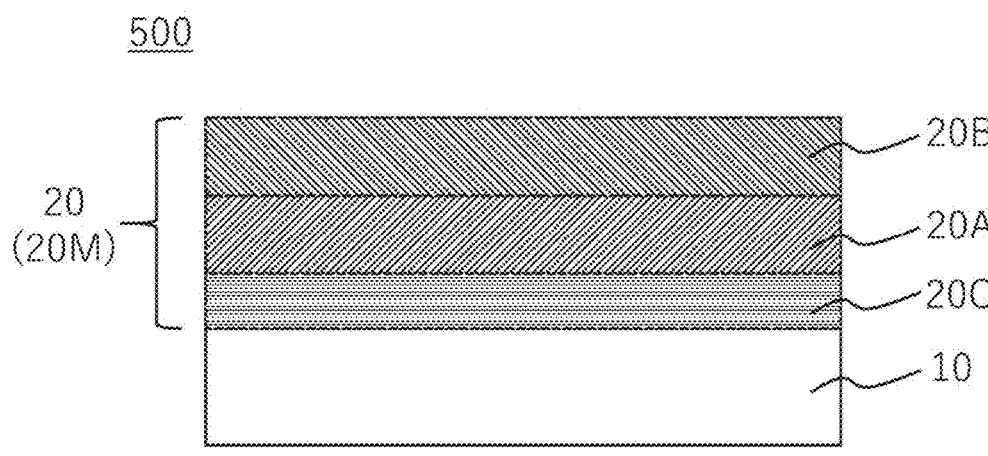
[FIG. 5B]
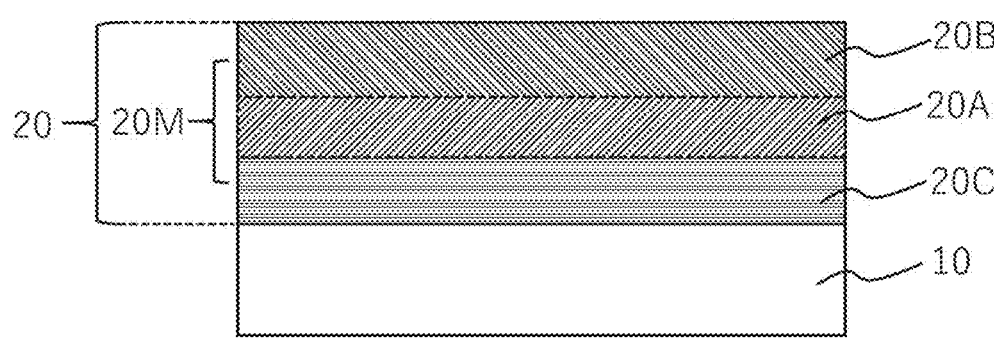

[FIG. 6A] <u>600</u>
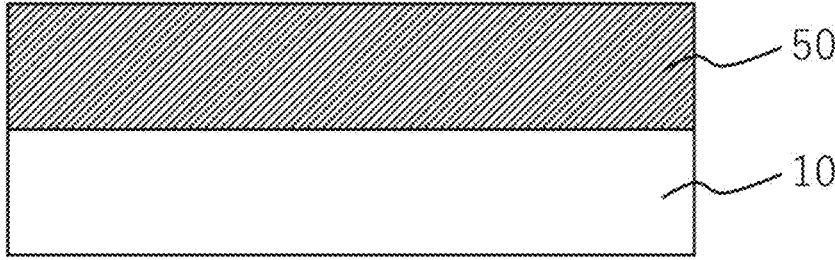
[FIG. 6B]
<u>600</u>
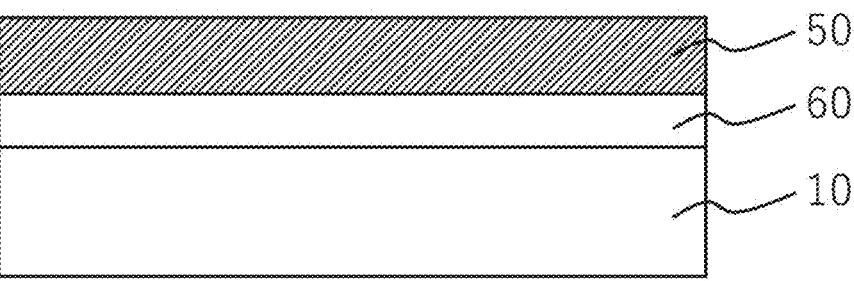

[FIG. 7]
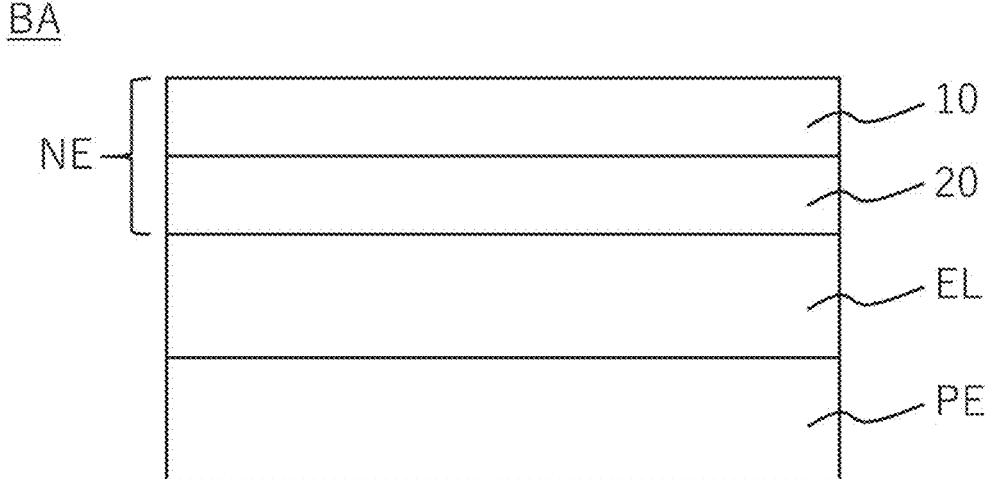
[FIG. 8]
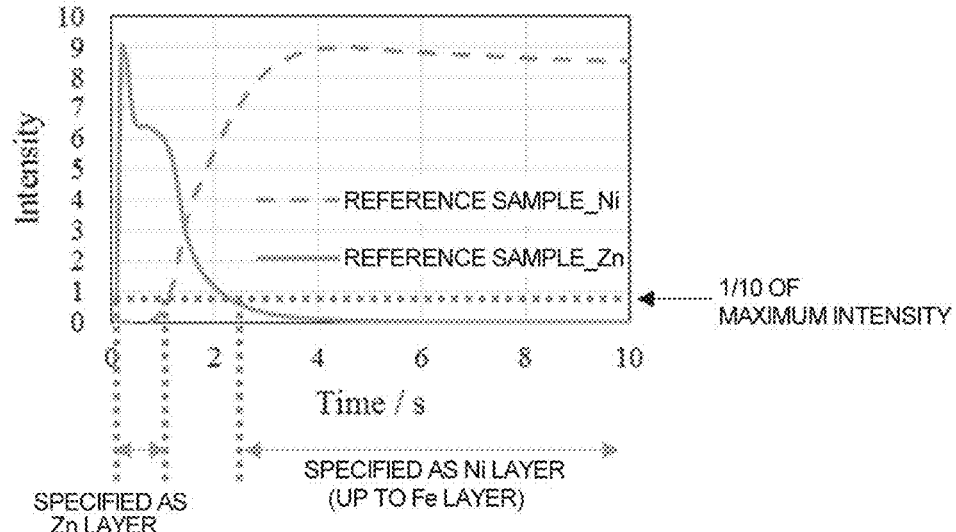

[FIG. 9A]
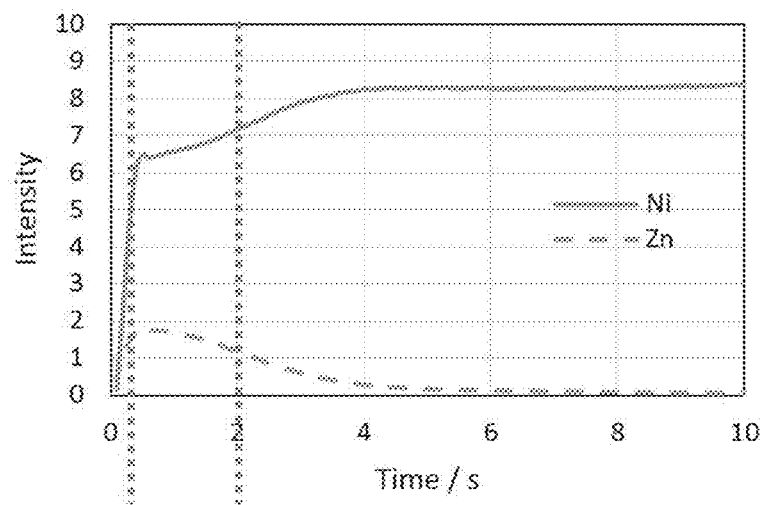
[FIG. 9B]
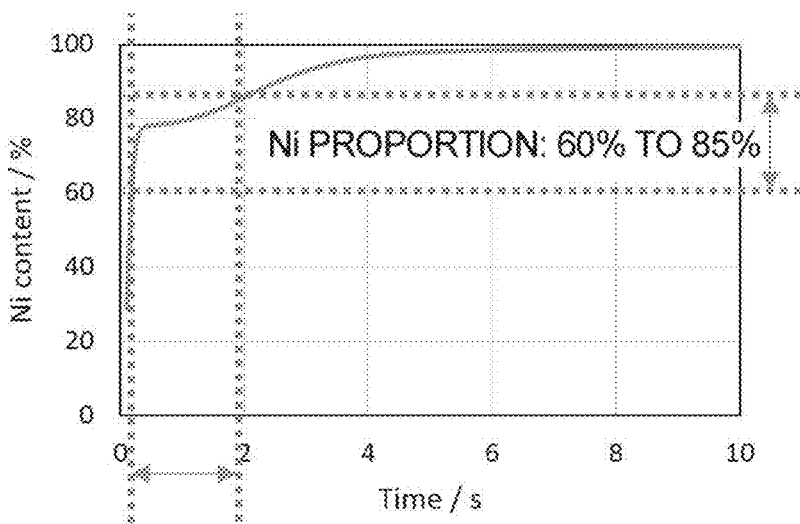
ETCHING TIME (UNIT: sec) FOR CALCULATING THICKNESS OF
FIRST REGION IN WHICH Ni PROPORTION IS 60% TO 85%

[FIG. 10A]
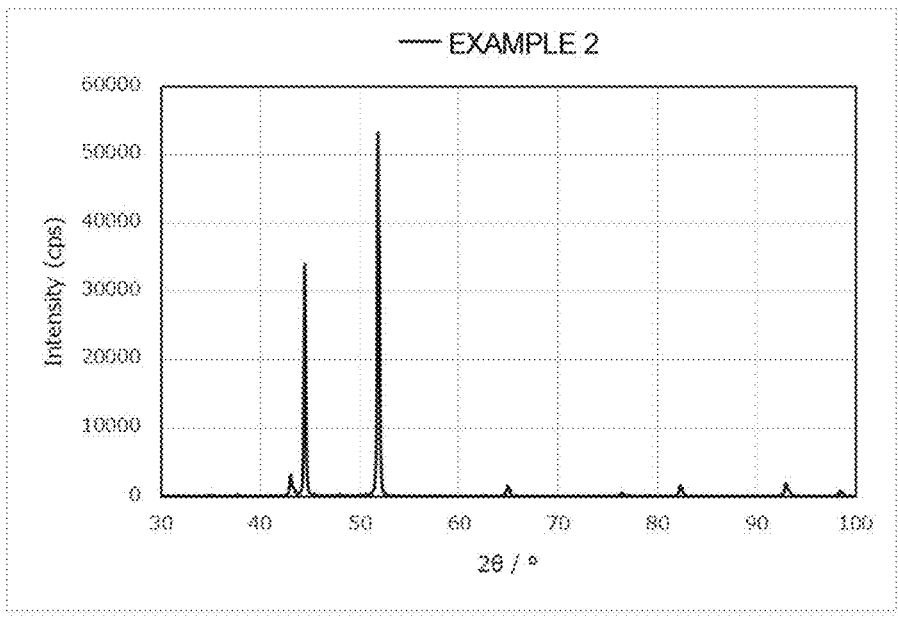
[FIG. 10B]
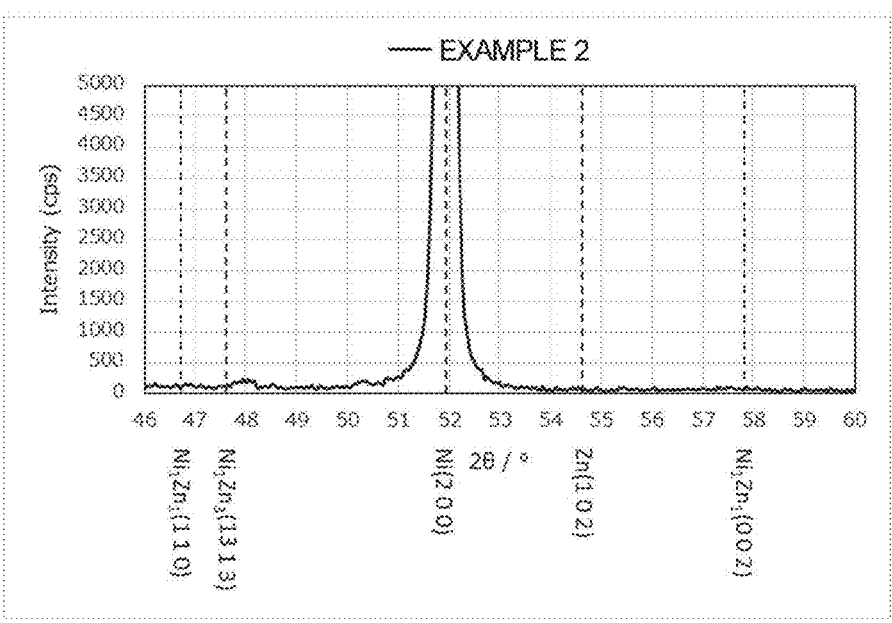

[FIG. 11A]
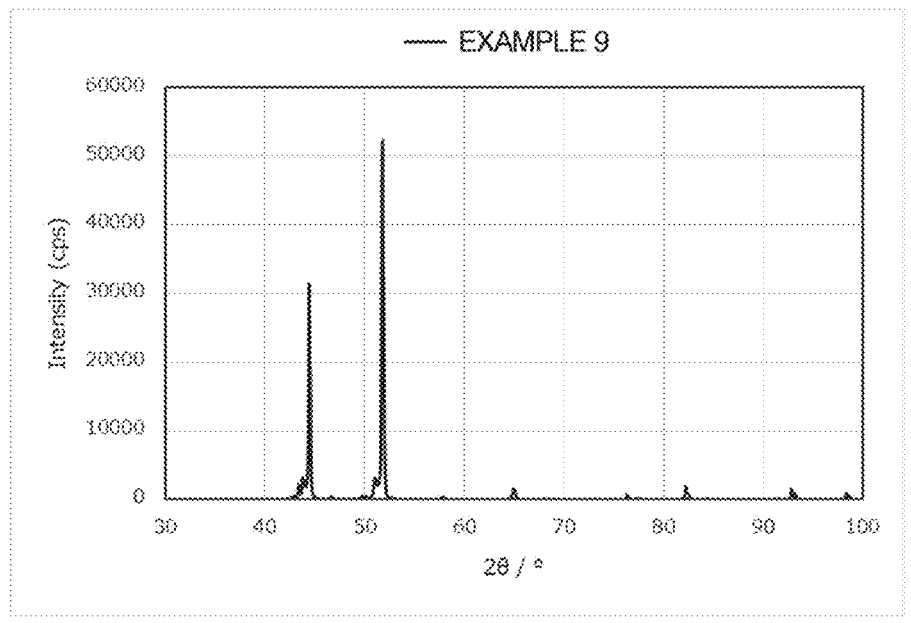
[FIG. 11B]
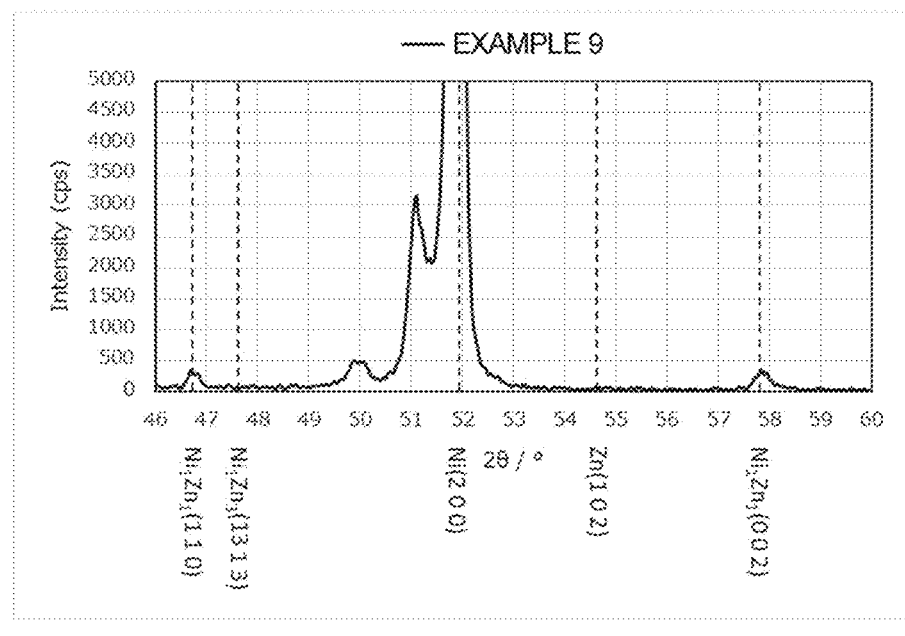

[FIG. 12A]
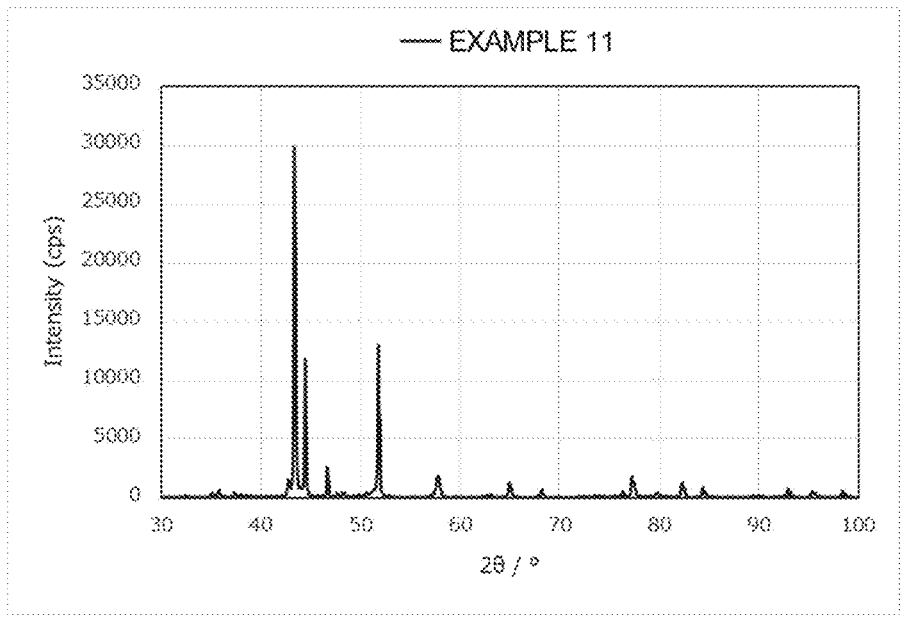
[FIG. 12B]
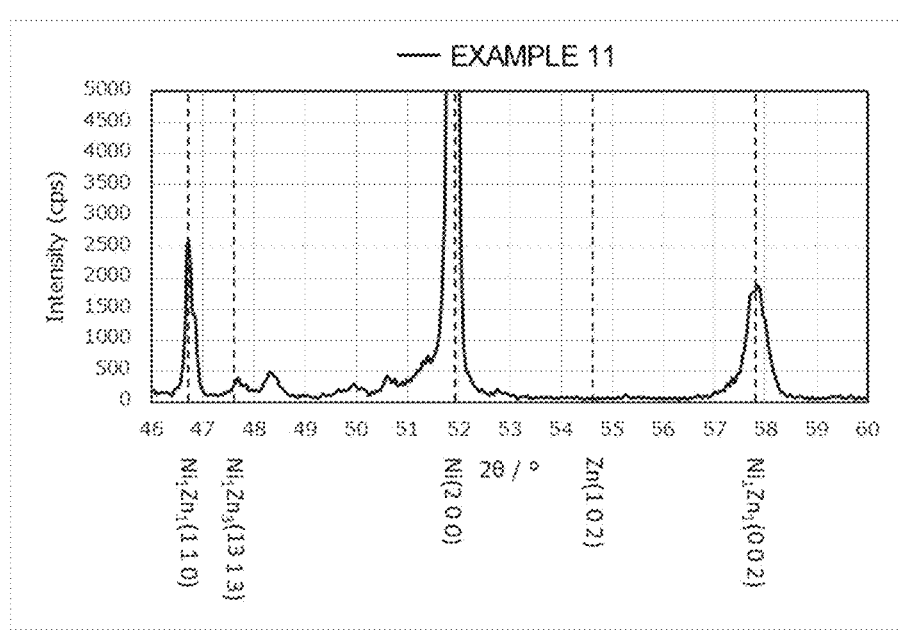

SURFACE-TREATED SHEET FOR ALKALINE SECONDARY BATTERY AND METHOD FOR MANUFACTURING SAME

TECHNICAL FIELD

The present invention relates to a surface-treated sheet for an alkaline secondary battery and a method for manufacturing same.

BACKGROUND ART

Generally-called alkaline batteries, each with an alkaline aqueous solution as an electrolyte solution, include some types of secondary batteries. As such secondary batteries, nickel-cadmium batteries, nickel-hydrogen batteries, and the like have been put to practical applications, and are widely known. Among alkaline secondary batteries, air-zinc batteries and nickel-zinc batteries, the latter batteries using nickel hydroxide or the like as a positive electrode active material and zinc as a negative electrode active material and also using an alkaline aqueous solution as an electrolyte solution, are under active development as next-generation batteries.

Merits of nickel-zinc batteries include that they have a high electromotive force and a large energy density among water-based batteries, zinc is inexpensive, they need no rare earth metals, both nickel and zinc are recyclable metals, they are superior in safety to lithium-ion batteries owing to the use of a aqueous electrolyte solution, and so on.

As one of problems for practical applications of air-zinc batteries and nickel-zinc batteries as secondary batteries, on the other hand, there is troublesome evolution of hydrogen gas during a charge and discharge cycle (including a self-discharge).

If evolution of hydrogen gas takes place and its evolution amount becomes too much, this may lead to potential problems of a reduction of battery performance and a battery leakage due to a rise in internal pressure. Especially in batteries in which zinc takes part in a battery reaction, these problems can arise remarkably in particular.

It is conventionally known that the problem of such evolution of hydrogen gas as mentioned above can be resolved by using a material of high hydrogen overvoltage in a negative electrode current collector.

In PTL 1 and PTL 2, for example, an attempt is made to resolve the problem of such evolution of hydrogen gas as mentioned above by increasing a hydrogen overvoltage through use of an alloy of copper and tin as a material as a current collector in a negative electrode.

CITATION LIST

Patent Literature

[PTL 1]
  JP Hei 2-75160A
[PTL 2]
  JP Hei 3-4449A

SUMMARY

Technical Problems

However, the techniques described in the above-cited patent literature are insufficient in corrosion resistance (electrolyte solution resistance) if they are applied to practical alkaline secondary batteries. Described specifically, an achievement of sufficient battery performance as an alkaline secondary battery requires to set the concentration of potassium hydroxide in an electrolyte solution at preferably 20 wt % or higher, with 25 to 40 wt % being needed for still higher performance.

With such an alloy of copper and tin as described in PTL 1 or PTL 2, the corrosion resistance is improved compared with copper alone, but there is no difference in that the alloy is dissolved under the environment of an electrolyte solution of such a high concentration as described above. Moreover, the dissolution is promoted further during a discharge reaction. Therefore, the alloy can be hardly used in practical applications.

If nickel that is generally considered to be good in alkali resistance is used, on the other hand, the dissolution in an alkaline electrolyte solution can be suppressed. However, nickel has a low hydrogen overvoltage, thereby raising a problem that hydrogen gas tends to evolve. Especially if zinc takes part in a battery reaction, nickel has a large difference in potential from zinc in an alkaline electrolyte solution so that hydrogen gas tends to evolve notably.

With the above-described problems in view, the present inventors have diligently studied to develop a surface-treated sheet for an alkaline secondary battery, which can suppress the evolution of hydrogen gas during a charge and discharge cycle of the alkaline secondary battery, can suppress the dissolution into an electrolyte solution, and can be used as a current collector material in a negative electrode, a battery tab or lead material, or a battery exterior material.

As a result, it has been found that the above-described problems can be both resolved by forming a surface-treated sheet in a specific configuration, leading to conceiving the present invention.

In the present invention, dissolution resistance to an electrolyte solution will also be referred to as "corrosion resistance," "dissolution resistance," "electrolyte solution resistance," or the like.

Solution to Problems

To resolve the above-described problems, (1) a surface-treated sheet for an alkaline secondary battery according to an aspect of the present invention for an alkaline secondary battery is a surface-treated sheet including a base material and a metal layer formed on at least one side of the base material. The metal layer includes an alloy layer that contains nickel and zinc. The alloy layer includes a first region in which a proportion of nickel is 60% to 85% based on a total content of nickel and zinc, and the first region has a thickness of 0.15 μm or greater.

(2) In the surface-treated sheet for an alkaline secondary battery as described above in item (1), in the alloy layer containing nickel and zinc, a total proportion of metal elements other than nickel and zinc may preferably be 0 wt % or greater and 20 wt % or smaller.

(3) In the surface-treated sheet for an alkaline secondary battery as described above in item (1) or (2), the first region may be located at an outermost surface in the metal layer.

(4) In the surface-treated sheet for an alkaline secondary battery as described above in any one of items (1) to (3), in the metal layer, a second region in which a proportion of Ni is 0% to smaller than 60% based on a total content of Ni and Zn may be further included on a side closer to a surface than the first region.

(5) In the surface-treated sheet for an alkaline secondary battery as described above in item (4), the second region may preferably have a thickness of greater than 0.0 μm and 4.0 μm or smaller.

(6) In the surface-treated sheet for an alkaline secondary battery as described above in any one of items (1) to (5), between the base material and the first region, a third region in which a proportion of Ni is greater than 85% and 100% or smaller based on a total content of Ni and Zn may preferably be further included.

(7) In the surface-treated sheet for an alkaline secondary battery as described above in item (6), the third region may preferably have a thickness of 0.2 to 5.0 μm.

(8) In the surface-treated sheet for an alkaline secondary battery as described above in any one of items (1) to (7), the alloy layer may preferably include an alloy phase having a crystal structure of $Ni_1Zn_1$, and in the alloy layer, an intensity ratio $I_{ratio}$ of a peak maximum intensity $I_{MAX (Ni1Zn1)}$ of the alloy phase having the crystal structure of $Ni_1Zn_1$ as measured by X-ray diffraction to a peak maximum intensity $I_{MAX(Si)}$ of a reference material Si as measured under the same conditions may preferably be 0.018 or greater.

(9) In item (8) described above, the intensity ratio $I_{ratio}$ may preferably be 0.021 or greater.

(10) In any one of items (1) to (9) described above, a content of zinc in the metal layer may preferably be 0.5 to 18.0 $g/m^2$.

(11) In any one of items (1) to (10) described above, a content of nickel in the metal layer may preferably be 1.7 to 45.0 $g/m^2$.

(12) In any one of items (1) to (11) described above, the intensity ratio $I_{ratio}$ may preferably be 0.050 or greater.

(13) In any one of items (1) to (12) described above, the metal layer or the alloy layer may further contain Co or Fe.

(14) In any one of items (1) to (13) described above, the base material may be any one of a steel sheet, an aluminum sheet, an aluminum alloy sheet, a copper sheet, a copper alloy sheet, an iron sheet, an iron alloy sheet, a stainless steel sheet, a nickel sheet, or a nickel alloy sheet.

To resolve the above-described problems, (15) an alkaline secondary battery according to another aspect of the present invention may preferably use the surface-treated sheet for an alkaline secondary battery as described above in any one of items (1) to (14).

To resolve the above-described problems, (16) a method according to a further aspect of the present invention for manufacturing a surface-treated sheet for an alkaline secondary battery includes a nickel plating layer formation step of forming a nickel plating layer on at least one side of a base material by electroplating, a zinc plating layer formation step of forming a zinc plating layer on the nickel plating layer by electroplating, and a heat treatment step of applying heat treatment to the nickel plating layer and the zinc plating layer. The heat treatment step includes an alloy layer formation step of thermally diffusing nickel and zinc so that an alloy layer is formed, and a first region formation step of forming a first region, in which a proportion of Ni is 60% to 85% based on a total content of nickel and zinc, with a thickness of 0.15 μm or greater in the alloy layer.

(17) In item (16) described above, the heat treatment step includes an alloy layer formation step of thermally diffusing nickel and zinc so that an alloy layer of nickel and zinc is formed including an alloy phase having a crystal structure of $Ni_1Zn_1$.

(18) In item (16) or (17) described above, a deposited amount of zinc in the zinc plating layer may preferably be 0.5 to 22.0 $g/m^2$.

(19) In any one of items (16) to (18) described above, a deposited amount of nickel in the nickel plating layer may preferably be 1.7 to 45.0 $g/m^2$.

Advantageous Effects of Invention

According to the present invention, both the suppression of gas evolution during a charge and discharge cycle of a battery and the suppression of dissolution of a surface-treated sheet for an alkaline secondary battery into an electrolyte solution can be satisfied to a high degree.

BRIEF DESCRIPTION OF DRAWINGS

FIG. 1 is a cross-sectional view schematically depicting a surface-treated sheet for an alkaline secondary battery according to a first embodiment for an alkaline secondary battery.

FIG. 2 is a cross-sectional view schematically depicting a surface-treated sheet for an alkaline secondary battery according to a modification of the first embodiment for an alkaline secondary battery.

FIG. 3(a) is a cross-sectional view schematically depicting a surface-treated sheet for an alkaline secondary battery according to a second embodiment for an alkaline secondary battery, and FIG. 3(b) is a cross-sectional view schematically depicting a surface-treated sheet for an alkaline secondary battery according to a modification of the second embodiment for the alkaline secondary battery.

FIG. 4(a) is a cross-sectional view schematically depicting a surface-treated sheet for an alkaline secondary battery according to a third embodiment for an alkaline secondary battery, and FIG. 4(b) is a cross-sectional view schematically depicting a surface-treated sheet for an alkaline secondary battery according to a modification of the third embodiment for the alkaline secondary battery.

FIG. 5(a) is a cross-sectional view schematically depicting a surface-treated sheet for an alkaline secondary battery according to a fourth embodiment for an alkaline secondary battery, and FIG. 5(b) is a cross-sectional view schematically depicting a surface-treated sheet for an alkaline secondary battery according to a modification of the fourth embodiment for the alkaline secondary battery.

FIG. 6(a) is a cross-sectional view schematically depicting a surface-treated sheet for an alkaline secondary battery according to a fifth embodiment for an alkaline secondary battery, and FIG. 6(b) is a cross-sectional view schematically depicting a surface-treated sheet for an alkaline secondary battery according to a modification of the fifth embodiment for the alkaline secondary battery.

FIG. 7 is a view schematically illustrating a battery that uses a surface-treated sheet for an alkaline secondary battery according to the present invention for an alkaline secondary battery.

FIG. 8 is a diagram illustrating intensity correction data of reference samples Ni and Zn in glow discharge optical emission spectroscopy (GDS).

FIGS. 9(a) and 9(b) are diagrams for determining a thickness of a first region in one example of the embodiment.

FIG. 10(a) is a diagram illustrating peaks at diffraction angles 2θ of 30° to 100° in X-ray diffraction results of a surface-treated sheet for an alkaline secondary battery according to Example 2 of the embodiment for an alkaline secondary battery before an anodic reaction, and FIG. 10(*b*) is an enlarged diagram illustrating peaks at diffraction angles 2θ of 46° to 60° in FIG. 10(*a*).

FIG. 11(*a*) is a diagram illustrating peaks at diffraction angles 2θ of 30° to 100° in X-ray diffraction results of a surface-treated sheet for an alkaline secondary battery according to Example 9 of the embodiment for an alkaline secondary battery before an anodic reaction, and FIG. 11(*b*) is an enlarged diagram illustrating peaks at diffraction angles 2θ of 46° to 60° in FIG. 11(*a*).

FIG. 12(*a*) is a diagram illustrating peaks at diffraction angles 2θ of 30° to 100° in X-ray diffraction results of a surface-treated sheet for an alkaline secondary battery according to Example 11 of the embodiment for an alkaline secondary battery before an anodic reaction, and FIG. 12(*b*) is an enlarged diagram illustrating peaks at diffraction angles 2θ of 46° to 60° in FIG. 12(*a*).

DESCRIPTION OF EMBODIMENTS

<Surface-Treated Sheet for Alkaline Secondary Battery>

First Embodiment

A description will hereinafter be made about embodiments for carrying out the present invention, although the present invention should not be limited to the following embodiments.

A surface-treated sheet of the present invention for an alkaline secondary battery is suitably used as a current collector, a tab/lead, and/or an exterior of the alkaline secondary battery, more specifically as a current collector material in a negative electrode of the alkaline second battery.

FIG. 1 is a cross-sectional view schematically depicting a surface-treated sheet 100 according to a first embodiment for an alkaline secondary battery.

As depicted in FIG. 1, the surface-treated sheet for an alkaline secondary battery 100 according to the embodiment has a base material 10, and a metal layer 20 formed on at least one side of the base material 10.

Here, the metal layer 20 includes an alloy layer 20M containing nickel and zinc. Further, the alloy layer 20M is characterized in that a first region 20, in which a proportion of nickel is 60% to 85% based on a total content of the nickel and zinc, is included with a predetermined thickness in a thickness direction of the alloy layer 20M. A description will hereinafter be made in detail about the individual elements. It is to be noted that "nickel" and "zinc" may hereinafter be also referred to as "Ni" and "Zn."

As the base material 10 in the embodiment, a metal sheet that is generally used as a base material in surface-treated sheets can be used as the base material in the surface-treated sheet for an alkaline secondary battery. In the embodiment, the term "metal sheet" should generally encompass those of such a thickness that they are generally called "metal foils."

Examples can include steel sheets, aluminum sheets, aluminum alloy sheets, copper sheets, copper alloy sheets, iron sheets, iron alloy sheets, stainless steel sheets, nickel sheets, nickel alloy sheets, and so on. These base materials may have been subjected beforehand to known surface treatment.

Among the base materials described above, a steel sheet is preferably used from viewpoints of cost, mechanical characteristics, procurement, and ease of plating treatment.

If still higher corrosion resistance is desired, use of a stainless steel sheet, a nickel sheet, or a nickel alloy sheet is preferred.

As a specific example of the type of a steel sheet, low carbon aluminum killed steel (carbon content: 0.01 to 0.15 wt %), ultra-low carbon steel (carbon content: lower than 0.01 wt %), or non-aging ultra-low carbon steel formed by adding Ti, Nb and/or the like to ultra-low carbon steel is suitably used.

No particular limitation is imposed on the thickness of the base material 10 in the embodiment, insofar as it is suited for a member as which the surface-treated sheet for an alkaline secondary battery 100 is to be used. A range of 0.01 to 2.0 mm is suited. If used as a tab/lead member or a current collector, the thickness of the base material 10 may be more preferably 0.025 to 0.8 mm, still more preferably 0.025 to 0.3 mm from viewpoints of strength, desired battery capacity, and the like.

The surface-treated sheet for an alkaline secondary battery 100 may be manufactured as a laminated electrolytic foil with the base material 10 also included therein.

A description will next be made about the metal layer 20 and the alloy layer 20M formed on at least one side of the base material 10. In the embodiment, the metal layer 20 includes, as depicted in FIG. 1, the alloy layer 20M that contains Ni and Zn.

As depicted in FIG. 1, one or more regions that are included in the metal layer 20 but are not included in the alloy layer 20M (one or more regions of unalloyed metals) may exist in the embodiment. In other words, a Ni layer and/or a Zn layer may exist in the metal layer 20.

Described specifically, the alloy layer 20M is an alloy layer containing Ni and Zn, and contains an alloy formed from Ni and Zn (nickel-zinc alloy, that is, Ni—Zn alloy). In the embodiment, this alloy layer is principally formed from a Ni—Zn alloy, and therefore is also described as "nickel-zinc alloy layer (Ni—Zn alloy layer."

As the composition of the Ni—Zn alloy in the alloy layer 20M in the embodiment, the Ni—Zn alloy may be any one of a solid solution, a eutectoid/eutectic, or a compound (intermetallic compound), or two or more of these forms may coexist.

In the embodiment, the metal elements contained in the alloy layer 20M are not limited to Ni and Zn described above, and may include one or more other metal elements insofar as objects of the present invention can be achieved. For example, metal elements such as Co, Fe, and Mo may be also contained in the alloy layer 20M. Here, the total proportion of metal elements other than Ni and Zn in the alloy layer 20M may be preferably 20 wt % or smaller, more preferably 10 wt % or smaller, still more preferably 5 wt % or smaller, particularly preferably 1 wt % or smaller. As the alloy layer 20M may be configured substantially from only nickel and zinc, the lower limit of the total proportion of the other metal elements is 0 wt %.

As a formation method of the alloy layer 20M in the embodiment, a method by plating or by plating and heat treatment is preferred. Examples of plating include methods such as electroplating, electroless plating, hot dipping, and dry plating. Of these, the method by electroplating is particularly preferred from viewpoints of cost, thickness control, and the like.

Examples include a method of sequentially forming a Ni plating layer and a Zn plating layer on at least one side of the base material 10 by a method such as electroplating, and then diffusing and alloying Ni and Zn by thermal diffusion treatment or the like, and the like.

In this case, the metal layer 20 is not required to be alloyed in its entirety as depicted in FIG. 1. It is sufficient if the alloy layer 20M is formed in a portion in the thickness direction of the metal layer 20 and the first region 20A is further formed in the portion. In other words, Ni in the Ni plating layer or Zn in the Zn plating layer may remain in part as a Ni layer or a Zn layer without alloy formation.

The Ni plating layer may be a pure Ni plating layer, or a Ni alloy plating layer (Ni—Co alloy plating, Ni—Fe alloy plating, or the like) formed primarily of Ni and containing Co, Fe, W, Mo, P and/or B. If Co and Fe are contained in the case of the Ni alloy plating layer, the weight proportion of a deposited amount of Ni as determined by X-ray fluorescence analysis is preferably 50 wt % or greater, more preferably 60 wt % or greater based on the deposited amount of all metal elements as determined by X-ray fluorescence analysis from viewpoints of cost and corrosion resistance to an alkaline electrolyte solution. If W, Mo, P, and B are contained, the weight proportion of a deposited amount of Ni as determined by X-ray fluorescence analysis is preferably 90 wt % or greater, more preferably 95 wt % or greater, still more preferably 98 wt % or greater based on the deposited amount of all metal elements from a viewpoint of productivity. Further, organic elements such as C and S may also be contained, and their total weight proportion may be preferably 0% to 0.5%.

Similarly, the Zn plating layer may be a pure Zn plating layer, or a plating layer (such as an alloy plating or a composite plating) formed primarily of Zn and containing metals such as Co and Mo or their compounds in addition to Zn. In the case of the plating layer containing the metal elements in addition to Zn, the weight proportion of a deposited amount of Zn is preferably 95 wt % or greater, more preferably 98 wt % or greater, still more preferably 99 wt % or greater based on the deposited amount of all metal elements as determined by X-ray fluorescence analysis. Further, organic elements such as C and S may also be contained, and their total weight proportion may be preferably 0% to 0.5%.

As an alternative, the alloy layer 20M may be formed by Ni—Zn binary alloy plating, Ni—Zn based alloy plating (for example, Ni—Zn—Co alloy plating), or the like. In this case, a thermal diffusion step may be, or may not be, applied.

About formation methods of these metal layer 20 and alloy layer 20M, details will be described later.

The alloy layer 20M in the embodiment is characterized in that the first region 20A, in which the proportion of Ni is 60% to 80% based on the total content of Ni and Zn, is included and the thickness of the first region 20A is 0.15 μm or greater.

Owing to having these features, both the suppression of gas evolution and electrolyte solution resistance, the objects of the present invention, can be satisfied.

The above-described features of the present invention are required for the reasons to be described hereinafter.

As mentioned above, there is the problem of evolution of hydrogen gas as one of problems for the practical application of alkaline secondary batteries. Under conditions for occurrence of a chemical reaction (self-discharge) other than a battery reaction, for example, due to the formation of a local battery between different kinds of metals within a battery, hydrogen gas is evolved if reaction conditions for evolution of hydrogen gas are satisfied. In a nickel-zinc battery, for example, zinc precipitates in the form of zinc or zinc oxide during a charge, and the precipitated zinc dissolves during a discharge. Zinc is one of metals having a lowest electrical potential among metals used in water-based batteries. When zinc is brought into the state of a local battery with another metal used in a battery, zinc hence has a high discharge capacity and tends to satisfy the conditions for evolution of hydrogen gas.

Active evolution of hydrogen gas, if any, leads to the problems of a reduction in battery performance and a leakage. Described specifically, if evolution of hydrogen gas occurs through a self-discharge, electrons that are supposed to contribute to a battery reaction are consumed for the evolution of hydrogen gas, leading to a reduction in battery performance. As the evolution amount of hydrogen gas increases, the battery performance is reduced further. A leakage may occur due to an increase in internal pressure and may lead to a reduction in safety. The term "self discharge" as used herein includes both side reactions during a charge and discharge cycle (chemical reactions including a hydrogen gas evolution process) and chemical reactions that take place during any time other than a charge or discharge cycle, in other words, in a natural discharge state.

To avoid such problems of a reduction in battery performance and a leakage, there is a requirement to suppress the evolution amount of hydrogen gas as much as possible (required performance/characteristic A: suppression of gas evolution). A collector material in particular is a material that is prone to evolve hydrogen gas and to induce a self-discharge, because zinc or the like in an electrolyte solution precipitates on the material and comes into direct contact with the material.

Such gas evolution is overcome by using a material having a high hydrogen overvoltage. As materials with a high hydrogen overvoltage, zinc and copper-tin alloy are known.

On the other hand, battery members are required to have resistance to an alkaline electrolyte solution (required performance/characteristic B: electrolyte solution resistance), and high electrolyte solution resistance is essential for a collector material in particular because the collector material is kept in contact with the electrolyte solution. However, a problem has been found that the resistance to an alkaline electrolyte solution is low if zinc is used as a collector material, and even if a copper-tin alloy is used, the alkaline electrolyte solution resistance is insufficient in an electrolyte solution containing potassium hydroxide at a concentration of 20 wt % or higher and a collector member itself is dissolved in such an electrolyte solution.

As a metal material excellent in alkaline resistance, there is nickel. As mentioned above, however, it is necessary for a secondary battery to resolve the problem of evolution of hydrogen gas from a negative electrode collector (required performance/characteristic A: suppression of gas evolution). Nickel has a low hydrogen overvoltage as a collector material and therefore cannot resolve the problem of evolution of hydrogen gas at a level sufficient for practical application.

With the foregoing problems in view, the present inventors conducted experiments through trials and errors. As a result, it has been found that the above-described required performance/characteristics A and B can be simultaneously satisfied at a level suited for practical applications by forming, as a material of a negative electrode collector in a nickel-zinc battery, an alloy layer on a metal sheet as a base material, and forming a region, in which the proportion of Ni is 60% to 85% based on the total content of Ni and Zn in the alloy layer, (the first region 20A in the embodiment) with a predetermined thickness, thereby leading to the present invention.

Now, reasons will first be given why as found by the present inventors, the lower limit and the upper limit of the proportion of Ni should be set at 60% and 85%, respectively, based on the total content of Ni and Zn in the first region 20A.

As a result of the trial and error experiments, it has been found that in a state of a Ni proportion lower than 60%, the gas evolution can be suppressed but the resistance to an alkaline electrolyte solution is reduced and the alloy layer on the base material is dissolved. As a result of the dissolution of the alloy layer, the electrolyte solution reaches a primer layer for the alloy layer and the base material, and may cause dissolution of the base material if the base material is a steel sheet or the like.

If the primer layer and the base material are each a nickel, steel use stainless (SUS) steel sheet or the like, the base material is not dissolved, but there are potential problems that hydrogen gas may be evolved and the battery performance may be adversely affected. It has been found that an alloy layer including a region, which has a Ni proportion of 60% or greater and is not dissolved in an alkaline electrolyte solution, is therefore essential on the base material.

In a state that the proportion of Ni exceeds 85% based on the total content of Ni and Zn, on the other hand, it has been found that there is resistance to an alkaline electrolyte solution but the evolution amount of hydrogen gas increases significantly. If such a surface-treated sheet for an alkaline secondary battery is used as a current collector in a secondary battery and the proportion of Ni in an outermost surface exceeds 85%, the problem of gas evolution may not be resolved accordingly. Such a surface-treated sheet for an alkaline secondary battery is hence not preferred for practical applications.

For the foregoing reasons, it has been found that the inclusion of the first region 20A, in which the proportion of Ni is 60% to 85%, is required to enable satisfaction of both electrolyte solution resistance and suppression of gas evolution.

A description will next be made about the thickness of the first region 20A which contains Ni in the above-described specific proportion. If the thickness of the first region 20A is smaller than 0.15 μm in the embodiment, use of the surface-treated sheet for an alkaline secondary battery of the embodiment as a member in an alkaline secondary battery cannot obtain electrolyte solution resistance at a practically applicable level, and further may fail to obtain the hydrogen gas evolution suppressing effect that would otherwise become available if the first region is located as an outermost layer. Therefore, such a small thickness is not preferred, and the first region is required to set at 0.15 μm or greater.

The thickness of the first region 20A is preferably 0.15 to 5.0 μm, and its lower limit is preferably 0.2 μm or greater in order to obtain the advantageous effects more stably. No particular limitation is imposed on the upper limit, but 5 μm or smaller is preferred from a viewpoint of suppression of zinc vaporization to be mentioned below because the formation of the first region with a large thickness requires to increase the deposited amount of zinc, in other words, to make the temperature higher or the time longer as a heat treatment condition.

The thickness of the first region 20A is more preferably 0.2 to 3.0 μm, still more preferably 0.2 to 2.0 μm.

In addition, the embodiment (with the first region 20A) also has the below-described noteworthy advantageous effect.

As pointed out in the embodiment, the inclusion of the first region 20A allows zinc to evenly precipitate from an electrolyte solution, and the precipitated zinc has good adhesion.

Described specifically, the evolution of gas can be suppressed in the embodiment. Therefore, there are not much reaction irregularities at the surface of an electrode sheet, and zinc is allowed to uniformly precipitate on the entire surface of the electrode sheet.

If gas evolves at the surface of the electrode sheet, the precipitation reaction becomes hard to occur at locations where the gas is evolving (reaction irregularities). If a location with precipitated zinc and another location without precipitated zinc occur on the surface of the electrode sheet, a local battery is formed between these locations so that a self-discharge takes place. As a result, the occurrence of such locations may lead to a reduction in battery performance, and therefore is not preferred. Further, if there are a location where zinc is prone to precipitate and a location where zinc is hard to precipitate, zinc continues to preferentially precipitate at the location where zinc has precipitated, thereby tending to form dendrites. The formation of dendrites leads to a reduction in battery performance due to short-circuiting between electrodes or separation of dendrites, and therefore is not preferred.

According to the embodiment, such problems as described above can be resolved, and improvements can be made in battery performance.

In the embodiment, no problem arises if the first region 20A is not formed over the entire part of the alloy layer 20M as depicted in FIG. 1. In other words, no problem arises if the first region 20A is formed in a part in the thickness direction of the alloy layer 20M. Further, the proportion of Ni in the first region is not required to be uniform in the thickness direction of the first region insofar as the proportion of Ni in the first region falls within the range of 60% to 85%, and the first region may hence have an inclined composition as in the case that it is formed by diffusion.

A region high in Ni proportion may exist between the first region 20A and the base material 10, although details will be described subsequently herein. On the other hand, a region low in Ni proportion may exist in the surface (on a side close to an electrolyte solution) of the first region 20A if Zn on the surface may be dissolved or a sacrificial protection is needed in an application as a current collector in a case that Zn is contained in the electrolyte solution as in a nickel-zinc battery or the like, although details will be described subsequently herein. If it is preferred for zinc not to dissolve from the surface-treated sheet for an alkaline secondary battery, the first region 20A is preferably located at the outermost surface of the surface-treated sheet for an alkaline secondary battery 100.

As a method for determining the proportion of Ni based on the total content of Ni and Zn in the alloy layer 20 in the embodiment, glow discharge optical emission spectroscopy (GDS) can be used. GDS is an analysis method that performs depth profile elemental analyses of samples subjected to various surface treatments such as plating and heat treatment, and is a destructive analysis by sputtering. As analysis methods that enable a depth profile elemental analysis with combined use of sputtering, Auger electron spectroscopy (AES) and electron spectroscopy for chemical analysis (ESCA) can also be applied similarly, although GDS is preferred from a viewpoint of etching depth.

As a method for determining a proportion of Ni by using DGS, the determination can be performed by, but is not limited to, a method to be described hereinafter, for example.

Using a pure Ni plating layer and a pure Zn plating layer with known deposited amounts of Ni and Zn, relations between sputtering depth and sputtering time (etching rates, μm/sec) by GDS are first determined. An etching rate in the case that the proportion of Ni is 50% based on the total content of Ni and Zn in an alloy layer is next determined as an average of the etching rate of the pure Ni plating layer and the etching rate of the pure Zn plating layer as determined above, and is recorded as an etching rate of the first region. Sputtering is performed in a depth direction of the surface-treated steel sheet from the surface of the alloy layer. From an etching time of an alloy layer range with Ni proportions of 60% to 85%, the thickness of the region can be calculated.

To the intensities of Ni, Zn, and the like in the measurement results so obtained, a coefficient-based correction can therefore be applied by a method commonly employed by those skilled in the art. Setting, as the boundary points of the individual regions, the points that correspond to, for example, ¹⁄₁₀ of the maximum intensities of Ni, Zn, and the like in the corrected data, the sputtering time to the depth of the Zn layer and the sputtering time to the depth of the Ni layer can be determined. From the range (unit: sec) of sputtering time of the region in which the proportion of Ni is 60% to 85%, the thickness (unit: μm) of the region, in which the proportion of Ni is 60% to 85%, can be calculated.

In the embodiment, the thickness of the first region can be determined as described above. As will be described subsequently herein, the thicknesses of the second and third regions can also be determined in a similar manner by using the same etching rate as that of the pure Zn plating layer as an etching rate when determining the thickness of the second region and by using the same etching rate as that of the pure Ni plating layer as an etching rate when determining the thickness of the third region.

Like a surface-treated sheet 200 according to a modification of the embodiment for the alkaline secondary battery as depicted in FIG. 2, the first region 20A may be located at the outermost surface of the metal layer 20. The term "outermost surface" as used herein should be defined to be a surface that is farthest from the base material 10 in the surface-treated sheet for an alkaline secondary battery 200. In other words, when the surface-treated sheet for an alkaline secondary battery according to the present invention is used, for example, as a current collector, the location where the surface-treated sheet for an alkaline secondary battery is kept in contact with an electrolyte solution will be assumed to be an outermost surface.

In each of the embodiment and its modification, the first region 20A has preferable resistance to an alkaline electrolyte solution as mentioned above, so that the dissolution of the electrode (current collector) material can be avoided. In each of the embodiment and its modification, the first region 20A is also provided with the characteristic of gas evolution suppression as mentioned above.

As a result, the use of the surface-treated sheet for an alkaline secondary battery of the embodiment or its modification in a secondary battery enables to retain preferred battery performance even when a charge-discharge cycle is repeated.

If the surface-treated sheet for an alkaline secondary battery of the embodiment or its modification is used as a current collector of a battery and the electrolytic solution comes into contact with both sides of the current collector, the surface-treated sheet for an alkaline secondary battery preferably has the first region with a predetermined thickness in each surface thereof.

Second Embodiment

A description will next be made about a second embodiment for carrying out the present invention. Description of parts common to the above-mentioned first embodiment is omitted herein, and different parts will be described primarily.

In a surface-treated sheet 300 of the embodiment for an alkaline secondary battery, there is a region (second region 20B), in which the proportion of Ni is lower than that in the first region 20A, in a layer upper than the first region 20A (on a side farthest from the base material 10) as depicted in FIG. 3(a). In the second region 20B, the proportion of Ni based on the total content of Ni and Zn is preferably 0% to lower than 60%.

Described specifically, the alloy layer 20M in the embodiment can be formed by formation of a Ni plating layer and a Zn plating layer by electroplating and subsequent thermal diffusion treatment as mentioned above. Here, the depth of diffusion of Ni into the Zn plating layer differs depending on the time and temperature of the thermal diffusion treatment.

The second region 20B is smaller in Ni proportion than the first region 20A, and therefore has lower resistance to an alkaline electrolyte solution compared with the first region 20A. When implemented in an actual battery, the second region 20B has a high possibility of dissolution with the electrolyte solution.

Even if the second region 20B is dissolved with the electrolyte solution, however, the first region 20A in which the proportion of Ni is 60% to 85% exists in the alloy layer 20M in the embodiment, and therefore surface-treated sheet 300 can retain sufficient electrolyte solution resistance as the whole electrode (current collector) owing to the first region 20A.

Even if the second region 20B, in which the proportion of Ni is small, exists at the surface closer to the electrolyte solution than the first region 20A due to manufacturing conditions for the alloy layer 20M as in the embodiment, there is no difficulty in practical applications. Owing to the inclusion of the second region 20B, in which the proportion of Zn is high, on the side of the surface, the surface-treated sheet 300 is provided with excellent salt damage resistance and superb primary antirust function.

In the embodiment, the thickness of the second region 20B is preferably greater than 0.0 to 4.0 μm or smaller. From a viewpoint of primary antirust function, the thickness of the second region 20B is preferably greater than 0.06 to 4.0 μm and smaller.

If the second region 20B is too thick, an excessive abundance of soluble zinc may lead to instability of battery performance and gas evolution. Therefore, the thickness of the second region 20B is preferably 4.0 μm or smaller. If the thickness of the Zn plating is made greater to form a thicker second region, the vaporization amount of Zn increases, possibly leading to contamination of a heat treatment apparatus depending on the temperature conditions of heat treatment when forming the first region 20A. From a viewpoint of suppressing the dissolution amount of the second region 20B, the thickness of the second region 20B is more preferably greater than 0.0 μm and 0.3 μm or smaller. From viewpoints of satisfying both the two advantageous effects, that is, improvements in primary antirust function by sacrificial protection and suppression of vaporization amount, the thickness of the second region 20B is more preferably greater than 0.3 μm and 3.0 μm or smaller, still more preferably greater than 0.3 μm and 1.5 μm or smaller, particularly preferably greater than 0.3 μm and 1.1 μm or smaller.

In the case of the embodiment, an outermost layer of the second region 20B does not have to match an outermost layer of the alloy layer 20M as depicted in FIG. 3(a), or may match the outermost layer of the alloy layer 20M as in a surface-treated sheet 300 according to a modification of the second embodiment for the alkaline secondary battery as depicted in FIG. 3(b).

Third Embodiment

A description will next be made about a third embodiment for carrying out the present invention. Description of parts common to the above-mentioned first embodiment is omitted herein, and different parts will be described primarily.

As depicted in FIG. 4(a), a surface-treated sheet 400 of the embodiment for an alkaline secondary battery further includes, between the base material 10 and the first region 20A, a third region 20C in which the proportion of Ni is greater than 85% to 100% based on the total content of Ni and Zn.

Advantageous effects available from the formation of a region of a high Ni proportion between the base material 10 and the first region 20A as in the embodiment are as will be described hereinafter.

Described specifically, in the case of the third region 20C in which the proportion of Ni exceeds 85% based on the total content of Ni and Zn, the resistance to an alkaline electrolyte solution is high as mentioned above so that the inclusion of the third region 20C is preferred. Generally speaking, a high Ni proportion is not preferred from a viewpoint of suppression of gas evolution. In the embodiment, however, the first region 20A having gas evolution suppressing effect exists on the third region 20C (on the side closer to the electrolyte solution). Also, from the viewpoint of suppression of gas evolution, the surface-treated sheet 400 of the embodiment is hence considered to pose no problem in practical applications.

From the viewpoint of electrolyte solution resistance, the thickness of the third region 20C is preferably 0.2 to 5.0 μm. If the third region 20C exceeds 5.0 μm in thickness, on the other hand, the effect of electrolyte solution resistance saturates, leading to a disadvantage in cost. Moreover, such an excessively thick third region occupies a high percentage of the limited space within a battery and may lower overall battery characteristics, and therefore is not preferred.

From a viewpoint of making a further improvement in electrolyte solution resistance, the thickness of the third region is more preferably 0.5 to 5.0 μm, still more preferably 0.8 to 5.0 μm.

In the case of the embodiment, a lowest layer in the third region 20C (on a side closest to the base material 10) does not have to match a lowest layer in the alloy layer 20M as depicted in FIG. 4(a), or may match the lowest layer in the alloy layer 20M as in a surface-treated sheet 400 according to a modification of the third embodiment for the alkaline secondary battery as depicted in FIG. 4(b).

Fourth Embodiment

In a surface-treated sheet 500 according to the embodiment for an alkaline secondary battery as depicted in FIG. 5(a), the metal layer 20 exists on at least one side of the base material 10, and in the metal layer 20, the third region 20C, the first region 20A, and the second region 20B exist in this order on the base material 10. In this case, the second region 20B, as mentioned above, has a high possibility of being dissolved if the surface-treated sheet 500 is implemented as a current collector in the battery and the second region 20B is kept in contact with an alkaline electrolyte solution. Even in such a case, however, dissolution of the current collector in its entirety can be avoided because the first region 20A has high electrolyte solution resistance.

In the embodiment, the metal layer 20 and the alloy layer 20M may match each other in thickness as depicted in FIG. 5(a), or as in a surface-treated sheet 500 according to a modification of the fourth embodiment for the alkaline secondary battery, the surface-treated sheet for an alkaline secondary battery may have a configuration that the thickness of the alloy layer 20M is smaller than that of the metal layer 20.

In the case of the configuration depicted in FIG. 5(b), the second region 20B, as mentioned above, also has a high possibility of being dissolved if the surface-treated sheet 500 is implemented as a current collector in the battery and the second region 20B is kept in contact with an alkaline electrolyte solution. Even in such a case, however, dissolution of the current collector in its entirety can be avoided because the first region 20A has high electrolyte solution resistance. Owing to the existence of the second region 20B, both the surface-treated sheets 500 have excellent salt damage resistance and superb primary rust prevention function.

Fifth Embodiment

FIG. 6(a) is a cross-sectional view schematically depicting a surface-treated sheet 600 according to the embodiment for an alkaline secondary battery. As depicted in FIG. 6(a), the surface-treated sheet 600 according to the embodiment has the base material 10 and a nickel-zinc alloy layer 50 formed on at least one side of the base material 10.

The nickel-zinc alloy layer 50 may be the same as the alloy layers 20M in the above-mentioned first to fourth embodiments.

A description will next be made about the nickel-zinc alloy layer 50 formed on the at least one side of the base material 10. In the nickel-zinc alloy layer 50, nickel (Ni) and zinc (Zn) are contained. As the composition of a nickel-zinc alloy, the nickel-zinc alloy may be any one of a solid solution, a eutectoid/eutectic, or a compound (intermetallic compound), or two or more of these forms may coexist.

In the embodiment, metal elements contained in the nickel-zinc alloy layer 50 may include one or more metal elements other than nickel (Ni) and zinc (Zn) insofar as the objects of the present invention can be achieved. For example, metal elements such as Co, Fe, and Mo may be contained in the nickel-zinc alloy layer 50.

Here, the total proportion of the metal elements other than nickel (Ni) and zinc (Zn) in the nickel-zinc alloy layer 50 may be preferably 10 wt % or smaller, more preferably 5 wt % or smaller, still more preferably 1 wt % or smaller, particularly preferably 0.5 wt % or smaller. As the nickel-zinc alloy layer 50 may be configured substantially from only nickel and zinc, the lower limit of the total proportion of the other metal elements is 0 wt %.

As a formation method of the nickel-zinc alloy layer 50 in the embodiment, a method by plating and heat treatment is preferred. Examples of the plating include methods such as electroplating, electroless plating, and dry plating. Of these, the method by electroplating is particularly preferred from the viewpoints of cost, thickness control, and the like.

Examples include a method of sequentially forming a nickel plating layer and a zinc plating layer on at least one side of the base material 10 by a method such as electroplating, and then diffusing and alloying nickel and zinc by thermal diffusion treatment or the like, and the like.

In this case, nickel in the nickel plating layer may remain in part as a nickel layer 60 without alloy formation. Described specifically, as in a surface-treated sheet 600 according to a modification of the fifth embodiment depicted in FIG. 6(a), the nickel layer 60 may be included between the base material 10 and the nickel-zinc alloy layer 50. If the nickel layer 60 is included, an electrolyte solution can be prevented from reaching the base material 10 as a result of dissolution of the nickel-zinc alloy layer 50. The inclusion of the nickel layer 60 is therefore more preferred.

The nickel layer 60 may be at least a portion of the third region 20C in the above-mentioned third embodiment and fourth embodiment, or may be the third region 20C itself.

From the viewpoint of primary antirust function, a zinc layer may be formed on the nickel-zinc alloy layer 50 by applying zinc plating after the formation of the nickel-zinc alloy layer 50 through diffusion of nickel and zinc by thermal diffusion treatment. In this case, the zinc layer on the nickel-zinc alloy layer 50 has a thickness of preferably 3.0 μm or smaller, with 1.0 μm or smaller being more preferred from the viewpoint of cost.

As an alternative, the nickel-zinc alloy layer 50 may be formed by forming a Ni—Zn binary alloy plating, a Ni—Zn based alloy plating (for example, a Ni—Zn—Co alloy plating) or the like, and then applying heat treatment.

About such a formation method of the nickel-zinc alloy layer 50, details will be described subsequently herein.

The nickel-zinc alloy layer 50 in the embodiment is characterized in that an alloy phase having a crystal structure of $Ni_1Zn_1$ is contained in a predetermined content or more. Owing to this configuration, the surface-treated sheet 600 of the embodiment or its modification enables to realize higher battery performance when used in the alkaline secondary battery.

Here, a description will be made about advantageous effects available from the inclusion of the alloy phase having the crystal structure of $Ni_1Zn_1$ in the nickel-zinc alloy layer 50 in the present invention.

If due to the formation of a local battery between different kinds of metals within a battery, a corrosion current is generated and a chemical reaction (self-discharge) other than a battery reaction occurs, energy that is supposed to contribute to the battery reaction is generally lost through the self-discharge reaction, thereby leading to a reduction in battery performance. The term "self-discharge" as used herein encompasses both side reactions (chemical reactions including a corrosion current generation process) during a charge and discharge cycle and chemical reactions during any time other than such a charge or discharge cycle, in other words, in a natural discharge state. The energy loss therefore increases with the corrosion current. The battery performance can hence be improved by reducing the corrosion current.

The present inventors made changes to plating conditions, heat treatment conditions and the like for the formation of the nickel-zinc alloy layer, and hence obtained alloy layers different in the contents of nickel and zinc, alloy structure, and the like. The individual alloy layers have been reacted with an electrolyte solution, whereby the contents of the metal elements, the structures of the alloys, and the like have been analyzed. In the course of a diligent study and repetitions of an experiment by the present inventors, it has been that the advantageous effect of the above-mentioned realization of higher battery performance can be obtained by the existence of the alloy phase, which has the crystal structure of $Ni_1Zn_1$, in the predetermined content or more.

The existence of $Ni_1Zn_1$ contained in the nickel-zinc alloy layer 50 can be verified using a measurement by X-ray diffraction (XRD). Described specifically, if a peak is obtained at diffraction angles 2θ of 56° to 59° in an XRD measurement, the existence of a crystal plane (002) in the crystal structure of $Ni_1Zn_1$ contained in the nickel-zinc alloy layer 50 can be verified, and the nickel-zinc alloy layer 50 can hence be determined to include the alloy phase having the crystal structure of $Ni_1Zn_1$.

The embodiment is further characterized in that as the content of $Ni_1Zn_1$ in the nickel-zinc alloy layer 50, an intensity ratio $I_{ratio}$ of a peak maximum intensity $I_{MAX(Ni1Zn1)}$ of $Ni_1Zn_1$ to a peak maximum intensity $I_{MAX(Si)}$, as measured by the above-described XRD, is determined in accordance with the following formula (1), $$I_{ratio} = I_{MAX(Ni1Zn1)}/I_{MAX(Si)} \tag{1}$$

and the intensity ratio $I_{ratio}$ is 0.018 or greater.

Because the intensity ratio expressed by the above formula (1) is 0.018 or greater in the embodiment, the alloy layer of $Ni_1Zn_1$ exists, in the nickel-zinc alloy layer 50, at a content sufficient to reduce a corrosion current. The intensity ratio in the above-described range is therefore preferred. As a consequence, excellent battery performance and electrolyte solution resistance can be obtained when the surface-treated sheet for an alkaline secondary battery is implemented in the alkaline secondary battery.

The alloy phase of $Ni_1Zn_1$ is allowed to exist more stably, thereby enabling to suppress variations in a wider range of battery characteristics. As a consequence, excellent battery performance is stably available. From this viewpoint, $I_{ratio}$ is preferably 0.021 or greater, more preferably 0.050 or greater, still more preferably 0.080 or greater, even still more preferably 0.100 or greater. No particular limitation is imposed on the upper limit, but from a viewpoint of manufacturing cost, $I_{ratio}$ is preferably smaller than 0.500, more preferably smaller than 0.400, still more preferably smaller than 0.350.

However, these $I_{MAX(Ni1Zn1)}$ and $I_{ratio}$ values change as a result of contact of the nickel-zinc alloy layer 50 to the electrolyte solution when the surface-treated sheet for an alkaline secondary battery is implemented in the alkali secondary battery. Nonetheless, it has been found that a reduction in battery performance due to repetitions of a charge and discharge cycle when the nickel-zinc alloy layer 50 is implemented in the alkaline secondary battery can be also overcome by specifying the $I_{ratio}$ value at a predetermined value or greater before contact of the nickel-zinc alloy layer 50 to the electrolyte solution (before the anodic reaction) as in the embodiment.

Here, the term "$I_{MAX(Ni1Zn1)}$" means the peak maximum intensity of a crystal plane (002) in a crystal structure of $Ni_1Zn_1$ as obtained at diffraction angles 2θ=56° to 59° in the above-described XRD measurement.

On the other hand, the term "$I_{MAX(Si)}$" means the peak maximum intensity of a crystal plane (220) in the crystal structure of silicon (Si) as a reference material as obtained at diffraction angles 2θ=45° to 48° in an XRD measurement.

In the embodiment, "NIST SRM Si powder (NIST SRM 640f)" should be used as the reference material silicon (Si), and the measurement should be made taking only the reference material as a measurement target. The above-described $I_{MAX(Si)}$ may be a value obtained by varying the measurement timing from $I_{MAX(Ni1Zn1)}$ described above.

Now, reasons will be given hereinafter why like the above-described formula (1), the maximum peak intensity of $Ni_1Zn_1$ is represented in terms of its ratio to the reference material in the embodiment.

Described specifically, the content of $Ni_1Zn_1$ can be ascertained in terms of its ratio in peak intensity to the reference material as described above under an environment where effects of a measurement instrument and measurement conditions are reduced. When specifying the diffraction intensity of a crystal plane A in a particular metal material, a method that nondimensionalizes the diffraction intensity of the crystal plane A by dividing it with the diffraction intensity of a crystal plane B to be subjected to comparison or the sum of determined diffraction intensities is generally employed to reduce the effects of the measurement instrument and measurement conditions.

In such a material that the concentrations of individual elements vary in the thickness direction as in the present invention, however, it has been difficult to select a crystal plane to be subjected to comparison. In the present invention, it has been therefore planned to specify the content of $Ni_1Zn_1$ by reducing the effects of the measuring instrument and measuring conditions through the selection, as a crystal plane to be subjected to comparison, of a crystal plane of a reference material to be measured under the same conditions, specifically a (220) plane of Si.

In the nickel-zinc alloy layer 50 in the embodiment, one or more alloy phases other than the alloy phase having the crystal structure of $Ni_1Zn_1$ may also be contained. For example, one or more alloy phases having crystal structures such as $Ni_5Zn_{22}$ or $Ni_3Zn_{22}$ identified in an alloy phase diagram, or $Ni_1Zn_3$ indexed as a peak by XRD, and/or $Ni_2Zn_{11}$ may be contained. These alloy phases contain zinc (Zn) in a still greater proportion in their crystal structures, but do not contain much nickel (Ni) in their crystal structures. Even if $Ni_1Zn_3$ and/or $Ni_2Zn_{11}$ exist on a side which is kept in contact with the electrolyte solution when the surface-treated sheet for an alkaline secondary battery is used as a current collector, they are hence not considered to consequently reduce the battery performance. Accordingly, $Ni_1Zn_3$ and/or $Ni_2Zn_{11}$ may be contained in the nickel-zinc alloy layer 50 to such an extent that the nickel-zinc alloy layer 50 is not prevented from taking the state of the alloy phase of $Ni_1Zn_1$, in other words, $I_{ratio}$ is not prevented from increasing to 0.018 or greater.

As a method for making a verification about the existence of an alloy phase having a crystal structure such as the above-described $Ni_1Zn_3$ and/or $Ni_2Zn_{11}$, a measurement by X-ray diffraction (XRD) can be also used as for $Ni_1Zn_1$. For example, the existence of $Ni_1Zn_3$ can be verified from a peak of a plane (1313) at $2\theta=46°$ to $49°$, and the existence of $Ni_2Zn_{11}$ can be verified from a peak of a plane (222) at $2\theta=33°$ to $36°$ (based on 01-072-2670 and 01-072-2671, respectively, in the database of ICDD PDF-2 2014).

TABLE 1

| | ICDD PDF-2 2014 | Crystal plane | Diffraction angles (2θ) |
|---|---|---|---|
| Ni1Zn1 | 01-072-2668 | (002) | 56° to 59° |
| Si | 00-027-1402 | (220) | 45° to 48° |

In each of the embodiment and its modification, the nickel-zinc alloy layer 50 may contain metal elements (Co, Fe, Mo, and the like) other than nickel (Ni) and zinc (Zn) as mentioned above. Using an X-ray Fluorescence (XRF)

Spectrometer, the kinds and proportions of the metals so contained can be measured by a known method.

As another method, the kinds of the metal elements (Co, Fe, Mo, and the like) other than nickel (Ni) and zinc (Zn) in the nickel-zinc alloy layer 50 can be also determined using glow discharge optical emission spectroscopy (GDS). GDS is an analysis method that performs depth profile elemental analyses of samples subjected to various surface treatments such as plating and heat treatment, and is a destructive analysis by sputtering.

As analysis methods that enable depth profile elemental analyses with combined use of sputtering, Auger electron spectroscopy (AES) and electron spectroscopy for chemical analysis (ESCA) can also be applied similarly, although GDS is preferred from the viewpoint of etching depth.

The alloy phase having the crystal structure of $Ni_1Zn_1$ in the nickel-zinc alloy layer 50 in each of the embodiment and its modification has favorable resistance to the alkaline electrolyte solution as mentioned above, so that dissolution can be avoided when the surface-treated sheet for 600 is implemented as an electrode (a tab/lead member and/or a current collector) material.

In each of the embodiment and its modification, the alloy phase having the crystal structure of $Ni_1Zn_1$ in the nickel-zinc alloy layer 50 can reduce such a corrosion current as mentioned above, and as a consequence, can realize an alkaline secondary battery having high battery performance.

The use of the surface-treated sheet for an alkaline secondary battery of the embodiment or its modification as a current collector in the alkaline secondary battery therefore enables to retain preferred battery performance even when a charge-discharge cycle is repeated.

If the surface-treated sheet 600 of the embodiment or its modification is used as a current collector in a battery configuration in which the current collector is kept in contact with an electrolyte solution, it is preferred to include a nickel-zinc alloy layer 50, which has an alloy phase having the crystal structure of $Ni_1Zn_1$, on each side of the surface-treated sheet 600.

<Alkaline Secondary Battery>

With reference to FIG. 6 and based on an embodiment to be described hereinafter, a description will next be made about an example of an alkaline secondary battery that uses the surface-treated sheet for an alkaline secondary battery according to the present invention.

An alkaline secondary battery BA of the embodiment can be, for example, a nickel-zinc battery or the like, and includes a positive electrode PE, a negative electrode NE, and an electrolyte EL (including an electrolyte solution ES). The positive electrode PE can be nickel and nickel oxide. The electrolyte solution ES is alkaline, and zinc oxide or zinc is preferred as a negative electrode active material contained in the electrolyte solution ES. The alkali secondary battery BA is characterized by using the surface-treated sheet for an alkaline secondary battery according to the present invention, for example, as a current collector material in the negative electrode NE in such a configuration as illustrated in FIG. 6, although the battery configuration is not limited to this configuration and, for example, may use a separator.

About the positive electrode PE, the electrolyte solution ES, the overall configuration of the alkaline secondary battery BA, and the like, detailed description is omitted herein because known configurations can be applied to them as desired.

The alkaline secondary battery BA of the embodiment uses the surface-treated sheet for an alkaline secondary battery according to the present invention as a current collector material in the negative electrode NE. Therefore, the alkaline secondary battery BA can realize both high electrolyte solution resistance and the suppression of gas evolution during a charge and discharge cycle at levels sufficient for practical use, and is preferred. Further, the alkaline secondary battery BA can also realize high battery performance at a level sufficient for practical use. Furthermore, both uniform precipitation of zinc and high adhesion of precipitated zinc to the electrode can also be achieved. In addition, the surface-treated sheet for an alkaline secondary battery according to the present invention can also be applied not only as a current collector but also as other battery members such as a tab/lead and a battery exterior owing to its excellent electrolyte solution resistance.

<Manufacturing Method of Surface-Treated Sheet for Alkaline Secondary Battery>

A manufacturing method of the surface-treated sheet for an alkaline secondary battery according to the present invention of a surface-treated sheet for an alkaline secondary battery will next be described based on an embodiment to be described hereinafter. However, the manufacturing method of the present invention should not be limited to the below-described embodiment.

The manufacturing method of the surface-treated sheet for an alkaline secondary battery according to the embodiment includes (1) a nickel plating layer formation step of forming a nickel plating layer on at least one side of a base material 10 by electroplating, and (2) a zinc plating layer formation step of forming a zinc plating layer on the nickel plating layer by electroplating.

In the manufacturing method according to the embodiment, the nickel plating layer and the zinc plating layer may be both formed on each side of the base material 10.

Here, the Ni plating layer may be a pure Ni plating layer, or a Ni alloy plating layer (Ni—Co alloy plating, Ni—Fe alloy plating, or the like) formed primarily of Ni and containing Co, Fe, W, Mo, P, and/or B. If Co and Fe are contained in the case of the Ni alloy plating layer, the weight proportion of a deposited amount of Ni as determined by X-ray fluorescence analysis is preferably 50 wt % or greater, more preferably 60 wt % or greater based on a deposited amount of all metal elements from the viewpoints of cost and electrolyte solution resistance. If W, Mo, P, and B are contained, the weight proportion of a deposited amount of Ni as determined by X-ray fluorescence analysis is preferably 90 wt % or greater, more preferably 95 wt % or greater, still more preferably 98 wt % or greater based on a deposited amount of all metal elements from the viewpoint of productivity. Further, organic elements such as C and S may also be contained, and their total weight proportion may be preferably 0% to 0.5%.

Similarly, the Zn plating layer may be a pure Zn plating layer, or a plating layer (such as an alloy plating or a composite plating) formed primarily of Zn and containing metals such as Co and Mo or their compounds in addition to Zn. In the case of the plating layer containing the metal elements in addition to Zn, the weight proportion of a deposited amount of Zn as determined by X-ray fluorescence analysis is preferably 95 wt % or greater, more preferably 98 wt % or greater, still more preferably 99 wt % or greater based on a deposited amount of all metal elements. Further, organic elements such as C and S may also be contained, and their total weight proportion may be preferably 0% to 0.5%.

In the manufacturing method of the embodiment, known conditions and the like can be applied as plating conditions and the like when forming the Ni plating layer, Ni—Co alloy plating layer, Zn plating layer, or Zn—Co alloy plating by electroplating. Examples of known Ni plating, Ni—Co alloy plating, Zn plating, and Zn—Co alloy plating will be described hereinafter.

[Examples of Ni Plating Bath and Plating Conditions]

Bath composition: known Watts bath

Nickel sulfate hexahydrate: 200 to 300 g/L

Nickel chloride hexahydrate: 20 to 60 g/L

Boric acid: 10 to 50 g/L

Bath temperature: 40° C. to 70° C.

pH: 3.0 to 5.0

Agitation: air agitation or jet agitation

Current density: 5 to 30 A/dm$^2$

As the bath composition, a known nickel sulfamate bath or citrate bath may be also used instead of the Watts bath described above. Moreover, an additive such as a known brighter may be further added to form a bright nickel plating or semi-bright nickel plating.

[Examples of Ni—Co Plating Bath and Plating Conditions]

<Nickel-Cobalt Alloy Plating>

Bath composition of plating bath: nickel sulfate, nickel chloride, cobalt sulfate and boric acid are contained to give a cobalt/nickel molar ratio of 0.1 to 1.0 (It is possible to use a plating bath formulated by adjusting the individual components as desired within ranges of 10 to 300 g/L of nickel sulfate, 20 to 60 g/L of nickel chloride, 10 to 250 g/L of cobalt sulfate, and 10 to 40 g/L of boric acid so that the cobalt/nickel molar ratio falls within the above-described range. Cobalt chloride may also be used.)

pH: 1.5 to 5.0

Bath temperature: 40° C. to 80° C.

Current density: 1 to 40 A/dm$^2$

[Examples of Zn Plating Bath and Plating Conditions]

Zinc sulfate heptahydrate: 100 to 400 g/L

Sodium sulfate: 10 to 100 g/L

Bath temperature: 30° C. to 70° C.

pH: 0.5 to 5.0

Agitation: air agitation or jet agitation

Current density: 10 to 60 A/dm$^2$

As described above, it is possible to use, as a plating bath for Zn plating, a bath that uses the sulfate as a supply source of Zn ions and contains a conductive auxiliary agent such as ammonium sulfate or sulfuric acid added as needed to the bath so that the electrical conductivity of the plating solution is increased. Moreover, an additive such as a known brighter may be further added to the plating bath to form a bright Zn plating or semi-bright Zn plating.

[Examples of Zn—Co Plating Bath and Plating Conditions]

Zinc sulfate heptahydrate: 100 to 400 g/L

Cobalt sulfate heptahydrate: 10 to 100 g/L

Ammonium sulfate: 0 to 100 g/L

Sodium sulfate: 0 to 100 g/L

Bath temperature: 30° C. to 60° C.

pH: 0.5 to 5.0

Agitation: air agitation or jet agitation

Current density: 10 to 60 A/dm$^2$

In the embodiment, the deposited amount of Zn in the Zn layer formed by Zn plating is preferably 0.5 to 22.0 g/m$^2$.

A deposited amount greater than 22.0 g/m$^2$ is not preferred in view of a significant increase in cost due to a reduction in the operability of electroplating or in view of a possibility of contamination of a manufacturing line through vaporization of Zn in a subsequent heat treatment step. From viewpoints of making a greater reduction in vaporization amount and enabling to stably form an alloy phase having the crystal structure of Ni$_1$Zn$_1$, the upper limit of the deposited amount is more preferably 11.0 $g/m^2$ or smaller, still more preferably 5.5 $g/m^2$ or smaller.

If the deposited amount is smaller than 0.5 $g/m^2$, on the other hand, there is a possibility that even through the subsequent heat treatment step, no sufficient diffusion layer is obtained and the first region 20A may not be formed at all or to any sufficient thickness, and as a consequence, there is a possibility that gas evolution suppressing effect may not be obtained. Such an excessively small deposited amount is not preferred accordingly. There is also a possibility that an alloy phase having the crystal structure of $Ni_1Zn_1$ may not be formed in the alloy layer (nickel-zinc alloy layer) even through the heat treatment step. For this reason, such an excessively small deposited amount is not preferred either. The lower limit of the deposited amount is preferably 0.8 $g/m^2$ or greater, more preferably 1.0 $g/m^2$ or greater, particularly preferably 1.3 $g/m^2$ or greater.

In the embodiment, the deposited amount of Ni in the Ni plating layer formed on the steel sheet by Ni plating is preferably 1.7 to 45.0 $g/m^2$. A deposited amount greater than 45.0 $g/m^2$ leads to a significant increase in cost due to a reduction in the operability of electroplating. On the other hand, a deposited amount smaller than 1.7 $g/m^2$ has a possibility that the diffusion layer may not be provided with sufficient electrolyte solution resistance. Such an excessively small deposited amount is not preferred accordingly.

From the viewpoints of cost and electrolyte solution resistance, the deposited amount of Ni is more preferably 3.4 to 27.0 $g/m^2$, still more preferably 5.1 to 22.5 $g/m^2$.

In the manufacturing method of the embodiment, the alloy layer 20M or the nickel-zinc alloy layer 50, which contains Ni and Zn, can be formed on at least one side of the base material 10 by further going through (3) the heat treatment step of applying heat treatment to the Ni plating layer and the Zn plating layer in addition to the above-described steps (1) and (2).

By controlling the temperature and time of the heat treatment under predetermined conditions in the above-described heat treatment step, the first region 20A can be formed, with a Ni proportion of 60% to 85% based on the total content of Ni and Zn and a thickness of 0.15 µm or greater, at the same time as the above-described formation of the alloy layer 20M.

By controlling the temperature and time of the heat treatment under predetermined conditions in the above-described heat treatment step, the alloy phase having the crystal structure of $Ni_1Zn_1$ can be formed in the nickel-zinc alloy layer 50 at the same time as the above-described formation of the nickel-zinc alloy layer 50.

Described specifically, the embodiment includes, in the heat treatment step (3), (3-1) an alloy layer formation step of thermally diffusing Ni and Zn so that an alloy layer is formed, and (3-2) a first region formation step of forming a first region, in which the proportion of Ni is 60% to 85% based on the total content of Ni and Zn, with a thickness of 0.15 µm or greater in the above-described alloy layer.

A modification of the embodiment includes, in the heat treatment step (3), (3-3) a nickel-zinc alloy layer formation step of thermally diffusing Ni and Zn so that a nickel-zinc alloy layer is formed. In further detail, this nickel-zinc alloy layer formation step (3-3) is considered to include (3-4) a $Ni_1Zn_1$ alloy phase formation step of forming a nickel-zinc alloy layer that contains an alloy phase having the crystal structure of $Ni_1Zn_1$.

A description will hereinafter be made about the $Ni_1Zn_1$ alloy phase formation step (3-4). In the nickel-zinc alloy layer, alloy phases of crystal structures such as $Ni_1Zn_3$ and $Ni_2Zn_{11}$ exist in addition to the alloy phase having the crystal structure of $Ni_1Zn_1$ as mentioned above. When forming an alloy of Ni and Zn, alloy phases other than the alloy phase having the crystal structure of $Ni_1Zn_1$ can be also formed accordingly. Among these alloy phases, the formation by heat treatment of the alloy phase, which has the crystal structure of $Ni_1Zn_1$ specified in the embodiment, requires Ni at a sufficient content relative to the content of Zn, and also requires appropriate heat treatment conditions. The contents of Zn and Ni before the heat treatment have already been mentioned.

A description will next be made about the heat treatment conditions. As conditions for the heat treatment step in the embodiment, conditions such as those to be described hereinafter can be exemplified. In the embodiment, the heat treatment may be continuous annealing or batch annealing (box annealing).

A temperature and time in continuous annealing treatment will be exemplified hereinafter.

In the case that the continuous annealing treatment includes (3-1) the alloy layer formation step and (3-2) the first region formation step, these steps (3-1) and (3-2) may be performed preferably at a temperature of 250° C. to 400° C. for 3 to 300 sec in a case of low-temperature continuous annealing, or at a temperature higher than 400° C. and 800° C. or lower within a range of 1 to 60 sec in a case of high-temperature continuous annealing. If lower than the above-described temperature or shorter than the above-described time, there is a possibility that the alloy layer 20M or the first region 20A may not be obtained sufficiently. Such an excessively low temperature or such an excessively short time is hence not preferred. On the other hand, a higher temperature or a longer time than the above-described heat treatment conditions for high-temperature continuous annealing is not preferred in view of unavailability of the intended first region 20A or possible contamination of a heat treatment line through vaporization of Zn from the alloy layer 20M, or from the viewpoint of cost.

If the continuous annealing treatment includes the nickel-zinc alloy layer formation step (3-3) and the $Ni_1Zn_1$ alloy phase formation step (3-4), these steps (3-3) and (3-4) may each be performed preferably within ranges of 400° C. or higher and 800° C. or lower and 10 to 300 sec. A temperature lower or a time shorter than the temperature or time range has a possibility that an alloy phase having the crystal structure of $Ni_1Zn_1$ may not be formed in the nickel-zinc alloy layer 50, and therefore is not preferred. On the other hand, a temperature higher or a time longer than the above-described heat treatment conditions is not preferred either due to possible vaporization of Zn without formation of an intended alloy phase having the crystal structure of $Ni_1Zn_1$ in the intended nickel-zinc alloy layer because zinc is prone to vaporize or possible contamination of a heat treatment line through vaporization of Zn, or from the viewpoint of cost. In view of the foregoing, it is more preferred to perform the continuous annealing treatment within the ranges of 450° C. or higher and 800° C. or lower and 10 to 300 sec.

If the batch annealing (box annealing) includes the alloy layer formation step (3-1) and the first region formation step (3-2), it is preferred to perform a soaking step is performed preferably under conditions within a range of 250° C. to 450° C. and a range of 1 to 15 hr. A temperature lower or a time shorter than the temperature or time range has a possibility that the alloy layer 20M or the first region 20A may not be obtained sufficiently, and therefore is not preferred. On the other hand, a temperature higher or a time longer than the above-described temperature or time range for the heat treatment is not preferred due to possible unavailability of the intended first region 20A or possible contamination of a heat treatment line through vaporization of Zn in the alloy layer 20M, or from the viewpoint of cost. The total time of heat treatment including a temperature increasing step and a cooling step is preferably 5 to 90 hr.

If the batch annealing (box annealing) includes the nickel-zinc alloy layer formation step (3-3) and the $Ni_1Zn_1$ alloy phase formation step (3-4), it is preferred to perform a soaking step within a range of 250° C. to 450° C. and within a range of 1 to 15 hr. A temperature lower or a time shorter than the temperature or time range has a possibility that an alloy phase having the crystal structure of $Ni_1Zn_1$ may not be formed in the nickel-zinc alloy layer 50, and therefore is not preferred. On the other hand, a temperature higher or a time longer than the above-described temperature or time range is not preferred due to a possibility of vaporization of Zn without formation of an intended alloy phase having the crystal structure of $Ni_1Zn_1$ in the nickel-zinc alloy layer or a possibility of contamination of a heat treatment line with vaporized Zn, or from the viewpoint of cost. The total time of the heat treatment including the temperature increasing step and the cooling step is preferably 5 to 90 hr.

In the embodiment, the above-described steps (3-1) and (3-2) are performed substantially at the same time, but without being limited to this manner, may be performed separately.

Similarly, the above-described steps (3-3) and (3-4) are performed substantially at the same time in the embodiment, but without being limited to this manner, may be performed separately.

Deposited amounts of Zn in the metal layers of the surface-treated sheet for an alkaline secondary batteries described in the first to fourth embodiments are preferably 0.5 to 22.0 $g/m^2$ in terms of the above-mentioned deposited amount of the Zn plating. The upper limit is more preferably 11.0 $g/m^2$ or smaller, still more preferably 5.0 $g/m^2$ or smaller.

The deposited amount of Zn may decrease relative to the deposited amount of Zn plating due to vaporization of Zn through the heat treatment after Zn plating. The decrease amount of Zn is preferably smaller than 5 $g/m^2$, more preferably smaller than 1.8 $g/m^2$, still more preferably smaller than 1.5 $g/m^2$, notably smaller than 1.0 $g/m^2$. The decrease amount of Zn through the heat treatment is the difference between the amount ($g/m^2$) of Zn before the heat treatment and the amount ($g/m^2$) of Zn after the heat treatment. The decrease rate is preferably within 40%, more preferably within 25%, still more preferably within 18%, notably within 10%. If the decrease amount is smaller than 1.5 $g/m^2$ or the decrease rate is within 10%, substantially no vaporization can be regarded to have taken place.

The decrease rate of Zn through the heat treatment can be expressed by the following formula:

$$100-(\text{amount } (g/m^2) \text{ of Zn after heat treatment})/ \\ (\text{amount } (g/m^2) \text{ of Zn before heat treatment}) \times \\ 100 (\%)$$

In the manufacturing method of the embodiment, no decrease takes place through the heat treatment in the deposited amount of Ni after the plating of Ni.

According to the manufacturing method of the embodiment, it is possible to manufacture a surface-treated sheet that can be suitably used, for example, as a current collector material in a negative electrode of an alkaline secondary battery.

The surface-treated sheet for an alkaline secondary battery so obtained has the first region 20A, in which the proportion of Ni is 60% to 85% based on the total content of Ni and Zn. Both the suppression of gas evolution and electrolyte solution resistance required for a secondary battery such as, for example, a nickel-zinc battery can hence be satisfied.

The surface-treated sheet for an alkaline secondary battery so obtained also includes then alloy phase having the crystal structure of $Ni_1Zn_1$ in the nickel-zinc alloy layer 50. Still higher battery performance can thus be also realized in combination from a secondary battery such as, for example, a nickel-zinc battery.

EXAMPLES

The present invention will hereinafter be described more specifically based on examples.

[Measurements and Evaluations]

A description will first be made about measurement and evaluation methods for surface-treated steel sheets of the individual examples.

With respect to each surface-treated steel sheet obtained, the existence/non-existence of a region, in which the proportion of Ni is 60% to 85% based on the total content of Ni and Zn, and the thickness of the region have been determined by glow discharge optical emission spectroscopy (GDS).

Further, each surface-treated steel sheet has been immersed in an alkaline solution, and has been allowed to undergo a reaction through application of an electric current with use of an electrochemical measurement system. The proportions of Ni and Zn in a surface of the surface-treated steel sheet have been determined by scanning Auger electron spectroscopy (AES) before and after the reaction, and an evaluation has been performed about electrolyte solution resistance.

On each surface-treated steel sheet after the heat treatment, an X-ray diffraction (XRD) measurement has been made to confirm the existence of an alloy phase having the specific crystal structure and to evaluate its electrolyte solution resistance.

In addition, a corrosion current has been measured, whereby evaluations have been made about the existence/non-existence of gas evolution suppressing effect and battery performance.

The individual measurements and evaluations have been performed as will be described hereinafter.

[Glow Discharge Optical Emission Spectroscopy (GDS)]

With respect to the alloy layer (nickel-zinc alloy layer) of each surface-treated steel sheet, the existence/non-existence of a region (first region), in which the proportion of Ni is 60% to 85% based on the total content of Ni and Zn, the thickness of the region, and the film configuration of the alloy layer have been determined by glow discharge optical emission spectroscopy (GDS).

With respect to a region (second region), in which the proportion of Ni is 0% to smaller than 60% based on the total content of Ni and Zn, and a region (third region), in which the proportion of Ni is greater than 85% to 100% based on the total content of Ni and Zn, their thickness measurements have been similarly made.

The GDS measurements have been made under the following conditions.

System: radio-frequency glow discharge emission spectrometer (manufactured by Horiba, Ltd.; "GD-Profiler 2")

Detection function: HDD mode

Anode diameter: 4 mm

Excitation mode: normal

Light source pressure: 600 Pa

Light source output: 35 W

Detection wavelengths: 352 nm (Ni), 481 nm (Zn), 371 nm (Fe)

Co and Mo have been not contained in Example 1.

As a specific thickness calculation method, the following procedures have been followed.

First, a Ni plating layer and a Zn plating layer, each of a similar thickness as in the respective examples, have been formed under similar plating conditions as in the respective examples. While conducting etching through sputtering by GDS at a surface of a steel sheet (called "reference sample") before thermal diffusion, respective intensities of Ni, Zn, and Fe in a thickness direction have been subsequently measured.

Denoting correction coefficients for the resulting respective intensities of Ni, Zn, and Fe by A, B, and C, the correction coefficients have been calculated so that the following formula has been satisfied.

$$\text{Max(Ni)} \times \text{A(Ni)} = \text{Max(Zn)} \times \text{B(Zn)} = \text{Max(Fe)} \times \text{C(Fe)}$$

where "Max(Ni)" represents the maximum intensity of Ni, "Max(Zn)" the maximum intensity of Zn, and "Max(Fe)" the maximum intensity of Fe.

Further, corrected data (see FIG. 8) have been obtained by multiplying the thus-obtained correction coefficients to the respective intensities of Ni, Zn, and Fe.

Setting points, where the intensities have been 1/10 of the maximum intensities of Ni, Zn, and Fe in the corrected data, as boundary points of the respective regions, the depth (sputtering time) of the Zn layer and the depth (sputtering time) of the Ni layer have been determined. In other words, the point where the intensity has been 1/10 of the maximum intensity of Zn has been set as the boundary between the second region and the first region, and the point where the intensity has been 1/10 of the maximum intensity of Fe has been set as the boundary between the first region and the third region.

By dividing the actual measurement values (unit: μm) of the thicknesses of the Ni layer and Zn layer, which have been determined by X-ray fluorescence analysis and are illustrated in Table 3, with the sputtering time data of the corresponding layers, the etching rates (unit: μm/sec) of the individual layers have been calculated as illustrated below in Table 2.

Further, based on the etching rates so obtained, an etching rate at Ni:Zn=1:1 has been assumed to be the average of the etching rate of Ni and the etching rate of Zn, and this average has been defined to be the etching rate of the Ni—Zn alloy.

TABLE 2

|  | Depth of plating layer [sec] | Etching rate [μm/sec] | Thickness of reference sample [μm] |
|---|---|---|---|
| Ni | 45.2 | 0.08 | 3.46 |
| Zn | 1 | 0.32 | 0.32 |
| Ni:Zn = 1:1 | . . . | 0.20 | . . . |

Sputtering has been next applied to the surface-treated steel sheet obtained after the heat treatment in each example, and the intensities of Ni and Zn in the alloy layer (nickel-zinc alloy layer) have been measured. After obtaining corrected data (see FIG. 9(a)) with use of the correction coefficients calculated based on the above-described reference sample, the proportion of Ni contained in the alloy layer (nickel-zinc alloy layer) has been calculated using the formula to be descried hereinafter, and a diagram (see FIG. 9(b)) illustrating the Ni proportion has been obtained. The term "proportion of Ni" in the present invention means an intensity ratio determined by the below-described formula from the intensity calculated by multiplying the above-mentioned correction coefficient to an intensity measured by GDS, and therefore is different from a percent by weight (wt %) or a percent by atom (at %).

$$\text{Percent of Ni} = (\text{Ni intensity}) / \{(\text{Ni intensity}) + (\text{Zn intensity})\} \times 100$$

From the Ni proportion range of 60% to 85% (see FIG. 9(b)), the range (unit: sec, see FIG. 9(b)) of data of sputtering time in the range of 60% to 85% in terms of the percentage of Ni has been determined.

Using the etching rate of the Ni—Zn alloy (Ni:Zn=1:1) as obtained above, the thickness (unit: μm) over the Ni proportions of 60% to 85% has been calculated from the range (unit: sec) of the data of sputtering time at Ni proportions of 60% to 85%, specifically by multiplying the etching rate of the Ni—Zn alloy (Ni:Zn=1:1) and the sputtering time of the first regions.

The respective thicknesses of the first region, second region and third region determined as described above are illustrated in Table 3 to be described subsequently herein.

The thickness of the first region (proportion of Ni: 60% to 85%) has been calculated using the etching rate at Ni:Zn=1:1 as mentioned above, but the thickness of the second region (proportion of Ni: 0 to smaller than 60%) has been calculated using the etching rate of Zn in Table 2.

Further, the thickness of the third region (proportion of Ni: greater than 85% to 100%) has been calculated using the etching rate of Ni in Table 2.

In Table 3, the cells in which the thickness of the diffusion layer as determined by GDS is "0.00" include those measured or calculated to be "0." Such cells also include cases in which a diffusion layer of an extremely small thickness not measurable by GDS has been formed. In this experiment, the measurement results in 0.2 sec from an initiation of measurement by GDS (during an intensity ramp-up period) have been decided not to be included in the time to be used for the calculation of thicknesses. As reasons for this exclusion, the initial ramp-up of the intensity is unstable due to a large difference in etching rate between nickel and zinc, and hence there is a possibility that the proportions of nickel and zinc may not have been measured precisely.

[X-Ray Fluorescence (XRF) Measurement]

Deposited amounts of individual metal elements in the Ni plating layer and the Zn plating layer before the heat treatment have been measured by X-ray fluorescence (XRF) analysis, and have been quantitatively determined by a calibration curve method. As an X-ray Fluorescence (XRF) Spectrometer, "ZSX100e" (manufactured by Rigaku Corporation) has been used. The X-ray fluorescence measurement enabled the quantitative determination of metal elements, which are contained in the surface treatment layer of the surface-treated sheet for an alkaline secondary battery, by the calibration curve method. It has been confirmed that in Examples 8, 12, 13, and 14, Co has been contained in a proportion of 0.1 to 2 wt % based on Zn. It has been also confirmed that in Examples 22 and 23, Co has been contained in a proportion of 0.1 to 2 wt % based on Zn and that Mo has been contained in a proportion of 0.001 to 1 wt % based on Zn. The results are illustrated in Table 3.

On each surface-treated steel sheet after the heat treatment, an X-ray fluorescence (XRF) measurement has been also made in a similar manner as in the above-mentioned X-ray fluorescence (XRF) measurement before the heat treatment, and the contents of nickel and zinc in the alloy layer (nickel-zinc alloy layer) have been determined. A decrease amount of zinc is illustrated in Table 3. It has been confirmed that nickel has not substantially decreased through the heat treatment. In Example 1, cobalt has been not detected.

[X-Ray Diffraction (XRD) Measurement]

On each surface-treated steel sheet after the heat treatment, an X-ray diffraction (XRD) measurement has been next made to confirm the existence of an alloy phase of the specific crystal structure. As an X-ray diffractometer, "SmartLab" (manufactured by Rigaku Corporation) has been used. As samples, the surface-treated steel sheet after the heat treatment has been used after cutting it into 20 mm×20 mm squares. Existence/non-existence of a peak derived from $Ni_1Zn_1$ at diffraction angles $2\theta=56°$ to $59°$ has been confirmed. As specific measurement conditions for XRD, the following specification has been employed.

<System Configuration>

X-ray source: $CuK\alpha$

Goniometer radius: 300 nm

Optical system: convergence method (Incident-side slit system)

Soller slit: 5°

Length limit slit: 5 mm

Divergence slit: ½°

(Receiving-side slit system)

Scatter slit: ½°

Soller slit: 5°

Receiving slit: 0.3 mm

Monochromatization: counter monochromator method

Detector: scintillation counter

<Measurement Parameters>

Tube voltage, tube current: 45 kV, 200 mA

Scan axis: $2\theta/\theta$

Scan mode: continuous

Measurement range $2\theta$: 30° to 100°

Scan speed: 10°/min

Data acquisition step: 0.05°

Peak intensity values (cps) of crystal planes (002) in the crystal structures of $Ni_1Zn_1$ as obtained at the above-described diffraction angles are illustrated in Tables 4 to 6.

On the peak intensity values so obtained, background removal has been performed using an integrated powder X-ray analysis software "PDXL" (created by Rigaku Corporation) to obtain peak maximum intensity values (cps) illustrated in Table 1.

The peak intensity ($I_{max(Si)}$) of "NIST SRM Si powder (NIST SRM 640f)" as a reference material silicon (Si) has been 4501.26 (cps) at a diffraction angle $2\theta=46.5°$. This $I_{max(Si)}$ has been measured at a timing different from those in the respective examples and comparative examples.

[Evaluation of Gas Evolution Suppression Effect and Evaluation of Battery Performance by Measurement of Corrosion Current Density]

With respect to each surface-treated steel sheet so obtained, an evaluation has been performed about its gas evolution suppressing effect by measuring a corrosion current density when immersed in an alkaline solution. Described specifically, as a test simulating a local battery with precipitated Zn, a Zn sheet has been used as a counter electrode, and a corrosion current density has been measured at an elapsed time point of 30 sec after immersion in the alkaline solution. The corrosion current density so measured has been employed as an indication for a tendency of gas evolution and an abundance in the amount of gas evolution.

Similarly, each surface-treated steel sheet has been immersed in an alkaline solution, and has been allowed to undergo a reaction (anodic reaction) through application of an electric current with use of the electrochemical measurement system. After the reaction, a corrosion current density has been measured. Based on the corrosion current density so measured, an evaluation has been performed about battery performance. Described specifically, as a test simulating a local battery with precipitated Zn, a Zn sheet has been used as a counter electrode, and a corrosion current density has been measured at an elapsed time point of 30 sec after immersion in the alkaline solution. The battery performance can be evaluated to be higher as the corrosion current density so measured is smaller.

Each corrosion current density measurement has been made under the below-described conditions, whereby a corrosion current density (unit: $mA/cm^2$) occurred between the below-descried test electrode and the below-descried counter electrode in a 30 wt % aqueous solution of potassium hydroxide has been measured.

System: "HZ5000" (manufactured by Hokuto Denko Corporation)

Test electrode: measurement sample (measurement diameter $\phi$: 6 mm)

Counter electrode: Zn sheet (20 mm×20 mm square, thickness: 0.5 mm)

Measuring method: chronocoulometry

Concerning the evaluation of gas evolution suppressing effect, the greater the corrosion current density measured in the above-described test, the higher the tendency of gas evolution and the more abundant the amount of gas evolution. In other words, as the corrosion current density becomes smaller, the material is considered to have higher gas evolution suppressing effect. Accordingly, the gas evolution suppressing effect has been evaluated to be "BBB" (i.e., good) when the corrosion current density has been 10.0 $mA/cm^2$ or smaller, or to be "DDD" (i.e., bad) when the corrosion current density has been greater than 10.0 $mA/cm^2$. The results are illustrated in Table 3.

In regard to the evaluation of battery performance, the battery performance has been evaluated to be "AAA" (i.e., very good) when the corrosion current density has been 40.0 $mA/cm^2$ or smaller, or to be "BBB" (i.e., good) when the corrosion current density has been greater than 40.0 $mA/cm^2$ and 120 $mA/cm^2$ or smaller. The results are illustrated in Table 5.

[Evaluation of Electrolyte Solution Resistance (Scanning Auger Electron Spectrometry)]

With respect to each surface-treated steel sheet obtained, the proportions of Ni and Zn in a surface of the surface-treated steel sheet have been measured before and after an anodic reaction test in an alkaline aqueous solution (30 wt % aqueous solution of potassium hydroxide). Based on the proportions of Ni and Zn so measured, electrolyte solution resistance has been evaluated.

Described specifically, assuming an anodic reaction at a negative electrode current collector during a discharge in which a dissolution reaction tends to proceed, a current has been applied using the electrochemical measurement system to conduct an anodic reaction test for an evaluation of dissolution resistance (electrolyte solution resistance) in the alkaline solution during a discharge. The proportions of Ni and Zn in the surface-treated steel sheet have been determined by scanning Auger electron spectrometry (AES). Numerical values so obtained are illustrated in Table 3.

In scanning Auger electron spectrometry, the proportions (unit: at %) of Ni an Zn can be determined, for example, by the following method. Described specifically, on the surface of the metal layer 20, a measurement is first made using a scanning Auger electron spectrometer (AES) after 10 nm etching, and the proportions (unit: at %) of Ni and Zn in the surface of the metal layer 20 are calculated. In the present invention, among peaks obtained through a measurement by the scanning Auger electron spectrometer, the peak at 830 to 860 eV is interpreted as a peak of Ni, the peak at 980 to 1010 eV is interpreted as a peak of Zn, and assuming the total of the proportions (unit: at %) of Ni and Zn to be 100 at %, the proportions (unit: at %) of Ni and Zn are measured.

The anodic reaction test has been conducted under the below-described conditions.

Electrochemical measurement system: "HZ5000" (manufactured by Hokuto Denko Corporation)

Test electrode: measurement sample (20 mm×20 mm)

Counter electrode: Cu sheet

Reference electrode: Ag/AgCl (with KCl saturation)

Electrolyte solution: 30 wt % aqueous solution of potassium hydroxide

Current density: 50 mA/cm$^2$

Measuring method: chronopotentiometry

Quantity of electricity: 21 C/cm$^2$

From the results of corrosion current density measurements and the results of measurements of the proportions in the surface by AES before the reaction in the alkaline solution, it is considered that, if as in Comparative Example 7 to be described subsequently herein, the metal layer 20 does not have the first region and the proportion of Ni in the surface is greater than 85%, the corrosion current density becomes pronouncedly large, and gas evolution tends to occur.

Therefore, such materials that the proportion of Ni exceeded 85% as a consequence of dissolution of the surface in the alkaline solution and the resulting change in the composition (in terms of proportions) of the surface have been evaluated to be "DDD" (i.e., bad) for their inappropriateness because gas evolution could tend to occur after dissolution even if no initial gas evolution has been observed.

[Evaluation of Electrolyte Solution Resistance (X-Ray Diffraction (XRD))]

In addition, electrolyte solution resistance has been evaluated by making an X-ray diffraction (XRD) measurement after each anodic reaction test that used the alkaline aqueous solution (30 wt % aqueous solution of potassium hydroxide) for the corresponding surface-treated steel sheet after the heat treatment. Described specifically, assuming an anodic reaction at a negative electrode current collector during a discharge, a current has been applied using the electrochemical measurement system to conduct a reaction (anodic reaction) for an evaluation of electrolyte solution resistance in the alkaline aqueous solution during a discharge. Subsequently, the peak intensity of $Ni_1Zn_1$ has been measured by an X-ray diffraction (XRD) measurement. If the intensity ratio $I_{ratio}$ ($=I_{MAX(Ni1Zn1)}/I_{MAX(Si)}$) has been 0.18 or greater at a timing either before or after the anodic reaction, the electrolyte solution resistance has been evaluated to be very good ("AAA"). Numerical values so obtained are illustrated in Table 6.

The anodic reaction test has been conducted under the conditions described above.

In each electrolyte solution resistance test and each corrosion current density measurement test, masking has been applied to surfaces other than the evaluated surface. Therefore, the surfaces other than the evaluated surface have not affected the test results.

[Calculation by ICP of Decrease Rate through Vaporization of Zn]

Samples have been prepared under similar treatment conditions as in Example 6. With respect to each sample after Ni plating, the sample after Zn plating and before heat treatment, and the sample after the heat treatment, all in sample preparation steps, the measurement of a deposited amount of Zn has been made. The measurements have been carried out using an inductively Coupled Plasma (ICP) emission spectrometer "ICPE-9000" (manufactured by Shimadzu Corporation).

The decrease rate of Zn through the heat treatment, in other words, the proportion of the difference in the deposited amount of Zn between before the heat treatment and after the heat treatment has been calculated based the deposited amount of Zn before the heat treatment, and has been recorded as a decrease rate through vaporization of Zn.

Example 1

[Production of Surface-Treated Steel Sheet]

First, a cold-rolled sheet (thickness: 250 μm) of low-carbon aluminum killed steel having the below-described chemical composition has been provided as a base material 10.

C: 0.04 wt %, Mn: 0.32 wt %, Si: 0.01 wt %, P: 0.012%, S: 0.014 wt %, balance: Fe and inevitable impurities.

The provided base material has been next subjected to electrolytic degreasing and pickling through sulfuric acid immersion, and then to Ni plating under the below-described conditions, whereby a Ni plating layer has been formed with Ni deposited in an amount of 30.81 g/m$^2$. The thickness of the Ni plating layer has been set at 3.46 μm.

Conditions for the Ni plating have been set as follows.

(Condition for Ni Plating)

Bath composition: Watts bath

Nickel sulfate hexahydrate: 250 g/L

Nickel chloride hexahydrate: 45 g/L

Boric acid: 30 g/L

Bath temperature: 60° C.

pH: 4.0 to 5.0

Agitation: air agitation or jet agitation

Current density: 10 A/dm$^2$

The base material with the Ni plating layer formed thereon has been next subjected to Zn plating, whereby a Zn plating layer has been formed with Zn deposited in an amount of 2.25 g/m$^2$. The thickness of the Zn plating layer has been set at 0.32 μm.

Conditions for the Zn plating have been set as follows.

(Condition for Zn Plating)

Bath composition

Zinc sulfate heptahydrate: 220 g/L

Sodium sulfate: 50 g/L

Bath temperature: 40° C.

pH: 1.0 to 2.0

Agitation: air agitation or jet agitation

Current density: 10 A/dm$^2$

To the steel sheet with the Ni plating layer and the Zn plating layer formed as described above, heat treatment has been next applied by continuous annealing under conditions of a heat treatment temperature of 250° C., a heat treatment time of 25 sec, and a reducing atmosphere. By this heat treatment, a surface-treated steel sheet having an alloy layer, which contained Ni and Zn, on one side thereof has been obtained. The results are illustrated in Tables 3 to 4.

Example 2

The procedures of Example 1 have been substantially followed except that the deposited amounts and thicknesses of the Ni plating layer and the Zn plating layer have been set as in Table 3 and the temperature and time of the heat treatment have been set as in Table 3. The results are illustrated in Tables 3 to 5. Further, the results of an X-ray diffraction (XRD) measurement before an anodic reaction are illustrated in FIGS. 10(*a*) and 10(*b*).

Example 3

The procedures of Example 1 have been substantially followed except that the deposited amounts and thicknesses of the Ni plating layer and the Zn plating layer have been set as in Table 3 and the temperature and time of the heat treatment have been set as in Table 3. The results are illustrated in Tables 3 and 4.

Example 4

The procedures of Example 1 have been substantially followed except that the deposited amounts and thicknesses of the Ni plating layer and the Zn plating layer have been set as in Table 3 and the temperature and time of the heat treatment have been set as in Table 3. The results are illustrated in Tables 3 to 5.

Example 5

The procedures of Example 1 have been substantially followed except that the deposited amounts and thicknesses of the Ni plating layer and the Zn plating layer have been set as in Table 3 and the temperature and time of the heat treatment have been set as in Table 3. The results are illustrated in Tables 3 to 6.

Example 6

The procedures of Example 1 have been substantially followed except that the deposited amounts and thicknesses of the Ni plating layer and the Zn plating layer have been set as in Table 3 and the temperature and time of the heat treatment have been set as in Table 3. The results are illustrated in Tables 3 and 4.

Using an ICP emission spectrometer, the decrease rate of Zn through vaporization has been calculated. The decrease rate has been found to be 8%. Therefore, 8% of the deposited amount of Zn is determined to have vaporized through the heat treatment. However, this result can be concluded to pose no problem even in view of the problem of contamination of a heat treatment line through vaporization of Zn and from the viewpoint of cost.

Example 7

The procedures of Example 1 have been substantially followed except that the deposited amounts and thicknesses of the Ni plating layer and the Zn plating layer have been set as in Table 3 and the temperature and time of the heat treatment have been set as in Table 3. The results are illustrated in Tables 3 and 4.

Example 8

A Zn—Co plating layer has been formed in lieu of the Zn plating layer in Example 1. Plating conditions are set as follows.
(Conditions for Zn—Co Plating)
   Bath composition
      Zinc sulfate heptahydrate: 230 g/L
      Cobalt sulfate heptahydrate: 30 g/L
      Ammonium sulfate: 30 g/L
   Bath temperature: 40° C.
   pH: 2.5 to 4.0
   Agitation: jet agitation
   Current density: 10 A/dm$^2$ The procedures of Example 1 have been substantially followed except that the deposited amount and thickness of the Ni plating layer have been set as in Table 3 and the temperature and time of the heat treatment have been set as in Table 3. The results are illustrated in Tables 3 and 4.

Example 9

The procedures of Example 1 have been substantially followed except that the deposited amounts and thicknesses of the Ni plating layer and the Zn plating layer have been set as in Table 3, the heat treatment has been changed to batch annealing (box annealing), and the temperature and time of the heat treatment have been set as in Table 3. The results are illustrated in Tables 3 to 6.

Using the ICP emission spectrometer, the decrease rate of Zn through vaporization has been calculated. The decrease rate has been found to be 3%. Therefore, 3% of the deposited amount of Zn is determined to have vaporized through the heat treatment. However, this result can be concluded to pose no problem even in view of the problem of contamination of a heat treatment line through vaporization of Zn and from the viewpoint of cost.

Further, the results of an X-ray diffraction (XRD) measurement before an anodic reaction are illustrated in FIGS. 11(*a*) and 11(*b*).

Example 10

The procedures of Example 1 have been substantially followed except that the deposited amounts and thicknesses of the Ni plating layer and the Zn plating layer have been set as in Table 3, the heat treatment has been changed to batch annealing (box annealing), and the temperature and time of the heat treatment have been set as in Table 3. The results are illustrated in Tables 3 and 4.

Example 11

The procedures of Example 1 have been substantially followed except that the deposited amounts and thicknesses of the Ni plating layer and the Zn plating layer have been set as in Table 3, the heat treatment has been changed to batch annealing (box annealing), and the temperature and time of the heat treatment have been set as in Table 3. The results are illustrated in Tables 3 to 6.

Further, the results of an X-ray diffraction (XRD) measurement before an anodic reaction are illustrated in FIGS. 12(*a*) and 12(*b*).

Example 12

A Zn—Co plating layer has been formed in lieu of the Zn plating layer under similar conditions as in Example 8 except that the current density has been changed to 10 A/dm$^2$. Its thickness have been set as in Table 3. Further, the procedures of Example 1 have been substantially followed except that the deposited amount and thickness of the Ni plating layer have been set as in Table 3, the heat treatment has been changed to batch annealing (box annealing), and the temperature and time of the heat treatment have been set as in Table 3. The results are illustrated in Tables 3 and 4.

Example 13

The procedures of Example 8 have been substantially followed except that the deposited amounts and thicknesses of the Ni plating layer and the Zn—Co plating have been set as in Table 3, the heat treatment has been changed to batch annealing (box annealing), and the temperature and time of the heat treatment have been set as in Table 3. The results are illustrated in Tables 3 and 4.

Example 14

To the surface-treated steel sheet obtained in Example 8, post-batch annealing (box annealing) has been further applied under the conditions illustrated in Table 3 after the continuous annealing. The results are illustrated in Tables 3 and 4.

Example 15

The procedures of Example 1 have been substantially followed except that the deposited amounts and thicknesses of the Ni plating layer and the Zn plating layer have been set as in Table 3, the heat treatment has been changed to batch annealing (box annealing), and the temperature and time of the heat treatment have been set as in Table 3. The results are illustrated in Tables 3 to 6.

Example 16

The procedures of Example 1 have been substantially followed except that the deposited amounts and thicknesses of the Ni plating layer and the Zn plating layer have been set as in Table 3, the heat treatment has been changed to batch annealing (box annealing), and the temperature and time of the heat treatment have been set as in Table 3. The results are illustrated in Tables 3 to 5.

Example 17

The procedures of Example 1 have been substantially followed except that the deposited amounts and thicknesses of the Ni plating layer and the Zn plating layer have been set as in Table 3, the heat treatment has been changed to batch annealing (box annealing), and the temperature and time of the heat treatment have been set as in Table 3. The results are illustrated in Tables 3 to 6.

Using the ICP emission spectrometer, the decrease rate of Zn through the heat treatment, in other words, the percentage of the difference in the deposited amount of Zn between before the heat treatment and after the heat treatment has been calculated based on the deposited amount of Zn before the heat treatment. The decrease rate has been found to be 20%. Therefore, 20% of the deposited amount of Zn is concluded to have vaporized through the heat treatment. However, this result can be concluded to pose no problem even in view of the problem of contamination of a heat treatment line through vaporization of Zn and from the viewpoint of cost. From a comparison with Example 9, it has been confirmed that the vaporization amount of Zn increases with the deposited amount of Zn.

Example 18

The deposited amounts and thicknesses of a Ni plating layer and Zn plating layer have been set as in Table 3, and batch annealing (box annealing) has been chosen as heat treatment. Annealing has been performed at 330° C. for 1.5 hr, followed by continuous annealing at 390° C. for 1 hr. Neither opening nor cooling of a furnace has been conducted at the time of the temperature change. Except for the above-described conditions, the procedures of Example 1 have been substantially followed. The results are illustrated in Tables 3 and 4.

Example 19

The procedures of Example 1 have been substantially followed except that the deposited amounts and thicknesses of the Ni plating layer and the Zn plating layer have been set as in Table 3, the heat treatment has been changed to batch annealing (box annealing), and the temperature and time of the heat treatment have been set as in Table 3. The results are illustrated in Tables 3 to 6.

Example 20

The procedures of Example 1 have been substantially followed except that the deposited amounts and thicknesses of the Ni plating layer and the Zn plating layer have been set as in Table 3, the heat treatment has been changed to batch annealing (box annealing), and the temperature and time of the heat treatment have been set as in Table 3. The results are illustrated in Tables 3 to 6.

Example 21

The procedures of Example 8 have been substantially followed except that the thicknesses of the Ni plating layer and the Zn—Co plating have been set as in Table 3, the heat treatment has been changed to batch annealing (box annealing), and the temperature and time of the heat treatment have been set as in Table 3. The results are illustrated in Tables 3 to 6.

Example 22

The procedures of Example 8 have been substantially followed except that the thicknesses of the Ni plating layer and the Zn—Co plating have been set as in Table 3, the heat treatment has been changed to batch annealing (box annealing), and the temperature and time of the heat treatment have been set as in Table 3. The results are illustrated in Tables 3 to 6.

Example 23

The procedures of Example 1 have been substantially followed except that the thicknesses of the Ni plating layer and the Zn plating have been set as in Table 3, the heat treatment has been changed to batch annealing (box annealing), and the temperature and time of the heat treatment have been set as in Table 3. The results are illustrated in Tables 3 and 4.

Comparative Example 1

The procedures of Example 1 have been substantially followed except that the deposited amounts and thicknesses of the Ni plating layer and the Zn plating layer have been set as in Table 3 and the heat treatment has been not performed. The results are illustrated in Tables 3 and 4.

Comparative Example 2

The procedures of Example 1 have been substantially followed except that the deposited amounts and thicknesses of the Ni plating layer and the Zn plating layer have been set as in Table 3 and the temperature and time of the heat treatment have been set as in Table 3. The results are illustrated in Tables 3 and 4.

Comparative Example 3

The procedures of Example 1 have been substantially followed except that the deposited amounts and thicknesses of the Ni plating layer and the Zn plating layer have been set as in Table 3 and the temperature and time of the heat treatment have been set as in Table 3. The results are illustrated in Tables 3 and 4.

Although the measurement of a decrease rate of Zn through heat treatment has been not made with any sample of Comparative Example 3, the decrease rate is considered to be 90% or greater because the decrease rate has been at a similar degree as in Comparative Example 5 (nickel sheet) in a measurement by AES before an anodic reaction test. Therefore, Zn abundantly vaporizes through heat treatment at a temperature as high as 850° C. Heat treatment at such a high temperature can hence be concluded to be unfavorable due to the possibility of contamination of a heat treatment line through vaporization of Zn or from the viewpoint of cost.

Comparative Example 4

The procedures of Example 1 have been substantially followed except that the deposited amounts and thicknesses of the Ni plating layer and the Zn plating layer have been set as in Table 3, the heat treatment has been changed to batch annealing (box annealing), and the temperature and time of the heat treatment have been set as in Table 3. The results are illustrated in Tables 3 and 4.

Using the ICP emission spectrometer, the decrease rate of Zn through the heat treatment, in other words, the percentage of the difference in the deposited amount of Zn between before the heat treatment and after the heat treatment has been calculated based on the deposited amount of Zn before the heat treatment. The decrease rate has been found to be 45%. Therefore, 45% of the deposited amount of Zn is concluded to have vaporized through the heat treatment. Zn tended to vaporize through heat treatment for a time as long as 8 hr despite at 500° C. that is a little high temperature. Such long heat treatment can hence be concluded to be unfavorable due to the possibility of contamination of a heat treatment line through vaporization of Zn or from the viewpoint of cost.

Comparative Example 5

Using a Ni sheet, an evaluation of gas evolution suppressing effect has been performed by a corrosion current density measurement.

Comparative Example 6

Using a Zn sheet, an evaluation of gas evolution suppressing effect has been performed by a corrosion current density measurement.

Comparative Example 7

The procedures of Example 1 have been substantially followed except that the deposited amounts and thicknesses of the Ni plating layer and the Zn plating layer have been set as in Table 3, the heat treatment has been changed to batch annealing (box annealing), and the temperature and time of the heat treatment have been set as in Table 3. The results are illustrated in Tables 3 and 4.

TABLE 3

| | Surface-treated metal sheet before heat treatment | | | | Heat treatment conditions | | | Surface-treated metal sheet after heat treatment | | | | |
| | treatment Thickness of plating before heat treatment | | | | | | | Before anodic reaction | | Thickness of diffusion layer*1 (GDS) | | |
| | (XRF) | | | | | | Total time | Content of Zn | Decrease amount | Ni | Ni | Ni |
| | Ni | | Zn | | Temperature | Soaking time | of box annealing | (XRF) | of Zn | 0%-60% | 60%- | 85%-100% |
| | g/m² | μm | g/m² | μm | ° C. | | | g/m² | (g/m²) | μm | μm | μm |
|---|---|---|---|---|---|---|---|---|---|---|---|---|
| Example 1 | 30.81 | 3.46 | 2.25 | 0.32 | 250 | 25 sec | — | — | — | 0.57 | 0.16 | 4.48 |
| Example 2 | 30.81 | 3.46 | 2.25 | 0.32 | 300 | 40 sec | — | 2.10 | 0.15 | 0.63 | 0.16 | 3.77 |
| Example 3 | 30.81 | 3.46 | 2.25 | 0.32 | 350 | 25 sec | — | — | — | 0.60 | 0.18 | 4.53 |
| Example 4 | 30.81 | 3.46 | 2.25 | 0.32 | 400 | 25 sec | — | — | — | 0.44 | 0.43 | 4.79 |
| Example 5 | 30.81 | 3.46 | 2.25 | 0.32 | 450 | 25 sec | — | 1.75 | 0.50 | 0.13 | 0.80 | 4.97 |
| Example 6 | 30.81 | 3.46 | 2.25 | 0.32 | 500 | 40 sec | — | 2.00 | 0.25 | 0.00 | 0.88 | 3.27 |
| Example 7 | 30.81 | 3.46 | 2.25 | 0.32 | 600 | 40 sec | — | 2.15 | 0.10 | 0.00 | 1.19 | 3.54 |
| Example 8 | 18.80 | 2.11 | 1.30 | 0.18 | 450 | 10 sec | — | — | — | 0.22 | 0.25 | 1.83 |
| Example 9 | 31.41 | 3.53 | 1.80 | 0.25 | 350 | 8 hr | 70 hr | 1.70 | 0.10 | 0.00 | 0.35 | 2.66 |
| Example 10 | 27.15 | 3.05 | 7.10 | 0.99 | 350 | 8 hr | 70 hr | 7.00 | 0.10 | 0.00 | 1.74 | 2.47 |
| Example 11 | 20.33 | 2.28 | 23.00 | 3.22 | 350 | 8 hr | 70 hr | 19.10 | 3.90 | 1.11 | 4 02 | 1.78 |
| Example 12 | 30.04 | 3.38 | 1.80 | 0.25 | 350 | 8 hr | 70 hr | 1.40 | 0.40 | 0.00 | 0.27 | 2.76 |
| Example 13 | 18.80 | 2.11 | 1.30 | 0.18 | 300 | 8 hr | 70 hr | — | — | 0.13 | 0.25 | 1.46 |
| Example 14 | 18.80 | 2.11 | 1.30 | 0.18 | 450 | 10 sec | 70 hr | — | — | 0.16 | 0.29 | 1.50 |

TABLE 3-continued

|  |  |  |  |  |  |  |  |  |  |  |  |  |
|---|---|---|---|---|---|---|---|---|---|---|---|---|
|  |  |  |  |  | 300 | 8 hr |  |  |  |  |  |  |
| Example 15 | 31.41 | 3.53 | 1.80 | 0.25 | 300 | 8 hr | 70 hr | 1.80 | 0.00 | 0.03 | 0.45 | 2.91 |
| Example 16 | 20.33 | 2.28 | 23.00 | 3.22 | 300 | 8 hr | 70 hr | 20.90 | 2.10 | 3.66 | 0.59 | 2.47 |
| Example 17 | 35.83 | 4.03 | 5.30 | 0.74 | 350 | 8 hr | 10 hr | 3.50 | 1.80 | 0.03 | 0.86 | 2.99 |
| Example 18 | 35.83 | 4.03 | 5.30 | 0.74 | 330 | 1.5 hr | 10 hr | 3.70 | 1.60 | 0.03 | 1.02 | 3.16 |
|  |  |  |  |  | 390 | 1 hr |  |  |  |  |  |  |
| Example 19 | 4.15 | 0.47 | 1.80 | 0.25 | 350 | 8 hr | 70 hr | 1.60 | 0.20 | 0.00 | 0.33 | 0.22 |
| Example 20 | 18.61 | 2.09 | 2.90 | 0.41 | 380 | 8 hr | 70 hr | 2.80 | 0.10 | 1.07 | 0.37 | 1.32 |
| Example 21 | 18.48 | 2.08 | 1.51 | 0.21 | 330 | 8 hr | 70 hr | 1.30 | 0.21 | 0.51 | 0.18 | 1.26 |
| Example 22 | 18.48 | 2.08 | 3.45 | 0.48 | 330 | 8 hr | 70 hr | 3.10 | 0.35 | 1.48 | 0.27 | 1.04 |
| Example 23 | 36.12 | 4.06 | 2.07 | 0.29 | 250 | 3 hr | 4 hr | 1.90 | 0.17 | 0.79 | 0.22 | 2.74 |
| Comparative Example 1 | 30.81 | 3.46 | 2.25 | 0.32 | — | — | — | — | — | 0.41 | 0.08 | 3.39 |
| Comparative Example 2 | 30.81 | 3.46 | 2.25 | 0.32 | 150 | 40 sec | — | — | — | 0.54 | 0.14 | 3.78 |
| Comparative Example 3 | 30.81 | 3.46 | 2.25 | 0.32 | 850 | 300 sec | — | — | — | 0.00 | 0.00 | 1.41 |
| Comparative Example 4 | 30.81 | 3.46 | 2.25 | 0.32 | 500 | 8 hr | 10 hr | 0.40 | 1.85 | 0.07 | 0.00 | 2.24 |
| Comparative Example 5 | — | — | — | — | — | — | — | — | — | — | — | — |
| Comparative Example 6 | — | — | — | — | — | — | — | — | — | — | — | — |
| Comparative Example 7 | 33.20 | 3.73 | 0.40 | 0.06 | 350 | 8 hr | 70 hr | 0.40 | 0.00 | 0.00 | 0.00 | 2.92 |

| | Surface-treated metal sheet after heat treatment | | | | | | |
|---|---|---|---|---|---|---|---|
| | Before anodic reaction | | | | After anodic reaction | | |
| | Film | Measurement of corrosion current | | Proportion in surface | Proportion in surface (AES) | | |
| | configuration above Ni*2 | Current | Gas evolution | | | | |
| | (AES and GDS) Configuration | density mA/cm$^2$ | suppressing effect | Ni % | Zn % | Ni % | Zn % | Evaluation AAA~DDD | Overall evaluation |

| | Film configuration above Ni*2 (AES and GDS) Configuration | Current density mA/cm$^2$ | Gas evolution suppressing effect | Ni % | Zn % | Ni % | Zn % | Evaluation AAA~DDD | Overall evaluation |
|---|---|---|---|---|---|---|---|---|---|
| Example 1 | Ni/Ni, Zn | <0.01 | BBB | 35 | 65 | 77 | 23 | BBB | BBB |
| Example 2 | Ni/Ni, Zn | 0.34 | BBB | 46 | 54 | 76 | 24 | BBB | BBB |
| Example 3 | Ni/Ni, Zn | 0.56 | BBB | 35 | 65 | 79 | 21 | BBB | BBB |
| Example 4 | Ni/Ni, Zn | 0.23 | BBB | 45 | 55 | 63 | 37 | BBB | BBB |
| Example 5 | Ni/Ni, Zn | 0.46 | BBB | 50 | 50 | 68 | 32 | BBB | BBB |
| Example 6 | Ni/Ni, Zn | 2.33 | BBB | 69 | 31 | 71 | 29 | BBB | BBB |
| Example 7 | Ni/Ni, Zn | 3.80 | BBB | 74 | 26 | 74 | 26 | BBB | BBB |
| Example 8 | Ni/Ni, Zn, Co/Zn, Co | 0.97 | BBB | 14 | 86 | 65 | 35 | BBB | BBB |
| Example 9 | Ni/Ni, Zn | 3.75 | BBB | 71 | 29 | 77 | 23 | BBB | BBB |
| Example 10 | Ni/Ni, Zn | 2.48 | BBB | 68 | 32 | 74 | 26 | BBB | BBB |
| Example 11 | Ni/Ni, Zn | 1.82 | BBB | 35 | 65 | 59 | 41 | BBB | BBB |
| Example 12 | Ni/Ni, Zn, Co | 3.47 | BBB | 74 | 26 | 75 | 25 | BBB | BBB |
| Example 13 | Ni/Ni, Zn, Co/Zn, Co | 1.93 | BBB | 18 | 82 | 76 | 24 | BBB | BBB |
| Example 14 | Ni/Ni, Zn, Co/Zn, Co | 1.61 | BBB | 14 | 86 | 74 | 26 | BBB | BBB |
| Example 15 | Ni/Ni, Zn | 0.70 | BBB | 44 | 56 | 74 | 26 | BBB | BBB |
| Example 16 | Ni/Ni, Zn | 0.78 | BBB | 32 | 68 | 53 | 47 | BBB | BBB |
| Example 17 | Ni/Ni, Zn/Zn | 0.26 | BBB | 18 | 82 | 75 | 25 | BBB | BBB |
| Example 18 | Ni/Ni, Zn | 0.26 | BBB | 32 | 68 | 74 | 26 | BBB | BBB |
| Example 19 | Ni/Ni, Zn | 3.12 | BBB | 73 | 27 | 75 | 25 | BBB | BBB |
| Example 20 | Ni/Ni, Zn | 0.15 | BBB | 56 | 44 | 74 | 26 | BBB | BBB |
| Example 21 | Ni/Ni, Zn, Co, Mo | 2.60 | BBB | — | — | — | — | — | BBB |
| Example 22 | Ni/Ni, Zn, Co, Mo | 4.26 | BBB | — | — | — | — | — | BBB |
| Example 23 | Ni/Ni, Zn | — | — | — | — | — | — | — | BBB |
| Comparative Example 1 | Ni/Ni, Zn/Zn | <0.01 | BBB | 22 | 78 | 89 | 11 | DDD | DDD |
| Comparative Example 2 | Ni/Ni, Zn/Zn | <0.01 | BBB | 20 | 80 | 91 | 9 | DDD | DDD |
| Comparative Example 3 | Ni, Fe | 37.32 | DDD | 95 | 5 | 95 | 5 | DDD | DDD |
| Comparative Example 4 | Ni/Ni, Zn | 2.45 | BBB | 69 | 31 | 95 | 5 | DDD | DDD |
| Comparative Example 5 | Ni | 38.12 | DDD | 95 | 5 | — | — | — | DDD |
| Comparative Example 6 | Zn | <0.01 | BBB | 22 | 78 | — | — | — | DDD |
| Comparative Example 7 | Ni/Ni, Zn | 25.20 | DDD | 86 | 14 | 90 | 10 | DDD | DDD |

TABLE 4

| | Surface-treated metal sheet before heat treatment Thickness of plating before heat treatment (XRF) | | | | Heat treatment condition | | Total time of box annealing | Film configuration above Ni (AES and GDS) | Surface-treated metal sheet after heat treatment Before anodic reaction | |
|---|---|---|---|---|---|---|---|---|---|---|
| | Ni | | Zn | | Temperature | Soaking time | | | $I_{MAX(Ni1Zn1)}$ (XRD) Intensity | $I_{ratio}$ (XRD) Intensity ratio |
| | g/m² | μm | g/m² | μm | ° C. | | | Configuration | cps | ratio |
| Example 1 | 30.81 | 3.46 | 2.25 | 0.32 | 250 | 25 sec | — | Ni/Ni, Zn | 3 | 0.001 |
| Example 2 | 30.81 | 3.46 | 2.25 | 0.32 | 300 | 40 sec | — | Ni/Ni, Zn | 69 | 0.015 |
| Example 3 | 30.81 | 3.46 | 2.25 | 0.32 | 350 | 25 sec | — | Ni/Ni, Zn | 36 | 0.008 |
| Example 4 | 30.81 | 3.46 | 2.25 | 0.32 | 400 | 25 sec | — | Ni/Ni, Zn | 100 | 0.022 |
| Example 5 | 30.81 | 3.46 | 2.25 | 0.32 | 450 | 25 sec | — | Ni/Ni, Zn | 268 | 0.060 |
| Example 6 | 30.81 | 3.46 | 2.25 | 0.32 | 500 | 40 sec | — | Ni/Ni, Zn | 351 | 0.078 |
| Example 7 | 30.81 | 3.46 | 2.25 | 0.32 | 600 | 40 sec | — | Ni/Ni, Zn | 228 | 0.051 |
| Example 8 | 18.80 | 2.11 | 1.30 | 0.18 | 450 | 10 sec | — | Ni/Ni, Zn, Co/Zn, Co | 56 | 0.012 |
| Example 9 | 31.41 | 3.53 | 1.80 | 0.25 | 350 | 8 hr | 70 hr | Ni/Ni, Zn | 259 | 0.058 |
| Example 10 | 27.15 | 3.05 | 7.10 | 0.99 | 350 | 8 hr | 70 hr | Ni/Ni, Zn | 1607 | 0.357 |
| Example 11 | 20.33 | 2.28 | 23.00 | 3.22 | 350 | 8 hr | 70 hr | Ni/Ni, Zn | 2020 | 0.449 |
| Example 12 | 30.04 | 3.38 | 1.80 | 0.25 | 350 | 8 hr | 70 hr | Ni/Ni, Zn, Co | 275 | 0.061 |
| Example 13 | 18.80 | 2.11 | 1.30 | 0.18 | 300 | 8 hr | 70 hr | Ni/Ni, Zn, Co/Zn, Co | 96 | 0.021 |
| Example 14 | 18.80 | 2.11 | 1.30 | 0.18 | 450 300 | 10 sec 8 hr | 70 hr | Ni/Ni, Zn, Co/Zn, Co | 64 | 0.014 |
| Example 15 | 31.41 | 3.53 | 1.80 | 0.25 | 300 | 8 hr | 70 hr | Ni/Ni, Zn | 405 | 0.090 |
| Example 16 | 20.33 | 2.28 | 23.00 | 3.22 | 300 | 8 hr | 70 hr | Ni/Ni, Zn | 25 | 0.006 |
| Example 17 | 35.83 | 4.03 | 5.30 | 0.74 | 350 | 8 hr | 10 hr | Ni/Ni, Zn/Zn | 639 | 0.142 |
| Example 18 | 35.83 | 4.03 | 5.30 | 0.74 | 330 390 | 1.5 hr 1 hr | 10 hr | Ni/Ni, Zn | 984 | 0.219 |
| Example 19 | 4.15 | 0.47 | 1.80 | 0.25 | 350 | 8 hr | 70 hr | Ni/Ni, Zn | 343 | 0.076 |
| Example 20 | 18.61 | 2.09 | 2.90 | 0.41 | 380 | 8 hr | 70 hr | Ni/Ni, Zn | 690 | 0.153 |
| Example 21 | 18.48 | 2.08 | 1.51 | 0.21 | 330 | 8 hr | 70 hr | Ni/Ni, Zn, Co, Mo | 361 | 0.080 |
| Example 22 | 18.48 | 2.08 | 3.45 | 0.48 | 330 | 8 hr | 70 hr | Ni/Ni, Zn, Co, Mo | 899 | 0.200 |
| Example 23 | 36.12 | 4.06 | 2.07 | 0.29 | 250 | 3 hr | 4 hr | Ni/Ni, Zn | 222 | 0.049 |
| Comparative Example 1 | 30.81 | 3.46 | 2.25 | 0.32 | — | — | — | Ni/Ni, Zn/Zn | 0 | 0.000 |
| Comparative Example 2 | 30.81 | 3.46 | 2.25 | 0.32 | 150 | 40 sec | — | Ni/Ni, Zn/Zn | 0 | 0.000 |
| Comparative Example 3 | 30.81 | 3.46 | 2.25 | 0.32 | 850 | 300 sec | — | Ni, Fe | 0 | 0.000 |
| Comparative Example 4 | 30.81 | 3.46 | 2.25 | 0.32 | 500 | 8 hr | 10 hr | Ni/Ni, Zn | 6 | 0.001 |
| Comparative Example 5 | — | — | — | — | — | — | — | Ni | — | — |
| Comparative Example 6 | — | — | — | — | — | — | — | Zn | — | — |
| Comparative Example 7 | 33.20 | 3.73 | 0.40 | 0.06 | 350 | 8 hr | 70 hr | Ni/Ni, Zn | 0 | 0.000 |

TABLE 5

| | Surface-treated metal sheet after heat treatment | | After anodic reaction Corrosion current | |
|---|---|---|---|---|
| | Before anodic reaction | | | |
| | $I_{MAX(Ni1Zn1)}$ (cps) | $I_{ratio}$ | mA/cm² | Evaluation of battery |
| Example 2 | 69 | 0.015 | 158 | — |
| Example 4 | 100 | 0.022 | 79 | BBB |
| Example 5 | 268 | 0.060 | 20 | AAA |
| Example 9 | 259 | 0.058 | 20 | AAA |
| Example 11 | 2020 | 0.449 | 29 | AAA |
| Example 15 | 405 | 0.090 | 28 | AAA |
| Example 16 | 25 | 0.006 | 150 | — |
| Example 17 | 639 | 0.142 | 23 | AAA |
| Example 19 | 343 | 0.076 | 23 | AAA |
| Example 20 | 690 | 0.153 | 27 | AAA |
| Example 21 | 361 | 0.080 | 25 | AAA |
| Example 22 | 899 | 0.200 | 19 | AAA |

TABLE 6

| | Before anodic reaction | | After anodic reaction | | Evaluation of electrolyte solution resistance |
|---|---|---|---|---|---|
| | $I_{MAX(Ni1Zn1)}$ (cps) | $I_{ratio}$ | $I_{MAX(Ni1Zn1)}$ (cps) | $I_{ratio}$ | |
| Example 5 | 268 | 0.060 | 272 | 0.060 | AAA |
| Example 9 | 259 | 0.058 | 275 | 0.061 | AAA |
| Example 11 | 2020 | 0.449 | 2078 | 0.462 | AAA |
| Example 15 | 405 | 0.090 | 419 | 0.093 | AAA |
| Example 17 | 639 | 0.142 | 594 | 0.132 | AAA |
| Example 19 | 343 | 0.076 | 239 | 0.053 | AAA |
| Example 20 | 690 | 0.153 | 646 | 0.144 | AAA |
| Example 21 | 361 | 0.080 | 316 | 0.070 | AAA |
| Example 22 | 899 | 0.200 | 931 | 0.207 | AAA |

The surface-treated steel sheets of the respective examples have been confirmed to have high electrolyte solution resistance and gas evolution suppressing effect, which enable their practical applications. On the other hand, the surface-treated metal sheets of the respective comparative examples have been confirmed to have neither of these characteristics.

Described in more detail, it has been confirmed that in each of Examples 6, 7, 9, 10, 12, and 19, the corrosion current density has been 10.0 mA/cm$^2$ or smaller and has been sufficient in terms of gas evolution suppressing effect, the proportion of Ni based on the total content of Ni and Zn remained substantially unchanged at 60% to 85% through the anodic reaction test, and the surface-treated steel sheet also had excellent electrolyte solution resistance.

In each of Examples 1 to 5, 8, 11, 13 to 18, and 20, the corrosion current density has been 5.0 mA/cm$^2$ or smaller, and has been sufficient in terms of gas evolution suppressing effect. As the change in the proportion of Ni based on the total content of Ni and Zn through the anodic reaction test, the proportion of Ni became greater after the reaction compared with before the reaction. Described specifically, the second region at the surface has been dissolved, but the proportion of Ni after the reaction has been 60% to 85% owing to the inclusion of the first region with a sufficient thickness. The surface-treated steel sheet has been confirmed to have high electrolyte solution resistance, which enables its practical applications.

In each of Examples 4 to 7, 9 to 13, 15, and 17 to 23, it has been demonstrated that the nickel-zinc alloy layer had good electrolyte solution resistance and realized good battery performance owing to the inclusion of the alloy layer, which had the crystal structure of $Ni_1Zn_1$, at the predetermined content.

In the comparative examples, on the other hand, the surface-treated metal sheets have not had any first region, or the first region has not had any sufficient thickness. It has been therefore confirmed that the surface-treated metal sheets have been large in corrosion current density and involved a potential problem of gas evolution, or that the surface-treated metal sheets have been low in electrolyte solution resistance and dissolved at the surfaces thereof through the reaction in the alkaline solution, and the Ni proportion exceeded 85%. Further, as a consequence of not including any alloy phase having the crystal structure of $Ni_1Zn_1$, some of the surface-treated metal sheets have been confirmed neither to have sufficient electrolyte solution resistance nor to realize high battery performance.

On the embodiments, modifications and examples described above, various changes or alterations can be made without departing from the spirit of the present invention.

The embodiments, modifications and examples have been described above primarily on the premise of application to nickel-zinc batteries. Without being limited to such application to nickel-zinc batteries, however, the present invention can also be applied to other batteries.

INDUSTRIAL APPLICABILITY

As has been described above, the surface-treated sheet for an alkaline secondary battery of the present invention can be suitably used as a current collector material, a tab/lead material, and/or an exterior material for an alkaline secondary battery. Further, the alkali secondary battery that uses the surface-treated sheet for an alkaline secondary battery of the present invention can be applied to industry in a wide variety of fields such as stationary applications and vehicle-mount applications.

REFERENCE SIGN LIST

100: Surface-treated sheet
200: Surface-treated sheet

300: Surface-treated sheet
400: Surface-treated sheet
500: Surface-treated sheet
600: Surface-treated sheet
10: Base material
20: Metal layer
20M: Alloy layer
20A: First region
20B: Second region
20C: Third region
50: Nickel-zinc alloy layer
60: Nickel layer

The invention claimed is:

1. A surface-treated sheet for an alkaline secondary battery, the surface-treated sheet for an alkaline secondary battery including a base material and a metal layer formed on at least one side of the base material, wherein
    the base material is a metal sheet,
    a proportion on a surface of the metal layer, as measured by Auger Electron Spectroscopy (AES), comprises from 32% to 74% nickel and from 26% to 68% zinc,
    the metal layer includes an alloy layer that contains nickel and zinc,
    the alloy layer includes a first region in which a proportion of nickel is 60% to 85% based on a total content of nickel and zinc, and
    the first region has a thickness of 0.15 μm or greater.

2. The surface-treated sheet for an alkaline secondary battery according to claim 1, wherein,
    in the alloy layer containing nickel and zinc, a total proportion of metal elements other than nickel and zinc is 0 wt % or greater and 20 wt % or smaller.

3. The surface-treated sheet for an alkaline secondary battery according to claim 1, wherein
    the first region is located at an outermost surface in the metal layer.

4. The surface-treated sheet for an alkaline secondary battery according to claim 1, wherein,
    in the metal layer, a second region in which a proportion of nickel is 0% to smaller than 60% based on a total content of nickel and zinc is further included on a side closer to a surface than the first region.

5. The surface-treated sheet for an alkaline secondary battery according to claim 4, wherein
    the second region has a thickness of greater than 0.0 μm and 4.0 μm or smaller.

6. The surface-treated sheet for an alkaline secondary battery according to claim 1, wherein
    between the base material and the first region, a third region in which a proportion of nickel is greater than 85% and 100% or smaller based on a total content of nickel and zinc is further included.

7. The surface-treated sheet for an alkaline secondary battery according to claim 6, wherein
    the third region has a thickness of 0.2 to 5.0 μm.

8. The surface-treated sheet for an alkaline secondary battery according to claim 1, wherein
    the alloy layer includes an alloy phase having a crystal structure of $Ni_1Zn_1$, and,
    in the alloy layer, an intensity ratio $I_{ratio}$ of a peak maximum intensity $I_{MAX(Ni1Zn1)}$ of the alloy phase having the crystal structure of $Ni_1Zn_1$ as measured by X-ray diffraction to a peak maximum intensity $I_{MAX(Si)}$ of a reference material Si as measured under the same conditions is 0.018 or greater.

9. The surface-treated sheet for an alkaline secondary battery according to claim 8, wherein the intensity ratio $I_{ratio}$ is 0.021 or greater.

10. The surface-treated sheet for an alkaline secondary battery according to claim 1, wherein a content of zinc in the metal layer is 0.5 to 18.0 g/m².

11. The surface-treated sheet for an alkaline secondary battery according to claim 1, wherein a content of nickel in the metal layer is 1.7 to 45.0 g/m².

12. The surface-treated sheet for an alkaline secondary battery according to claim 8, wherein the intensity ratio $I_{ratio}$ is 0.050 or greater.

13. The surface-treated sheet for an alkaline secondary battery according to claim 1, wherein the metal layer or the alloy layer further contains Co or Fe.

14. The surface-treated sheet for an alkaline secondary battery according to claim 1, wherein the base material is any one of a steel sheet, an aluminum sheet, an aluminum alloy sheet, a copper sheet, a copper alloy sheet, an iron sheet, an iron alloy sheet, a stainless steel sheet, a nickel sheet, or a nickel alloy sheet.

15. An alkaline secondary battery using the surface-treated sheet for an alkaline secondary battery according to claim 1.

16. A method for manufacturing a surface-treated sheet for an alkaline secondary battery according to claim 1, comprising:

a nickel plating layer formation step of forming a nickel plating layer on at least one side of the base material by electroplating;

a zinc plating layer formation step of forming a zinc plating layer on the nickel plating layer by electroplating; and a heat treatment step of applying heat treatment to the nickel plating layer and the zinc plating layer, wherein the heat treatment step includes an alloy layer formation step of thermally diffusing nickel and zinc so that the alloy layer is formed, and a first region formation step of forming the first region, in which a proportion of Ni is 60% to 85% based on a total content of nickel and zinc, with a thickness of 0.15 μm or greater in the alloy layer;

the base material and the alloy layer forming the surface-treated sheet for the alkaline secondary battery.

17. The method for manufacturing the surface-treated sheet for an alkaline secondary battery according to claim 16, wherein the heat treatment step includes an alloy layer formation step of thermally diffusing nickel and zinc so that an alloy layer of nickel and zinc is formed including an alloy phase having a crystal structure of $Ni_1Zn_1$.

18. The method for manufacturing the surface-treated sheet for an alkaline secondary battery according to claim 16, wherein a deposited amount of zinc in the zinc plating layer is 0.5 to 22.0 g/m².

19. The method for manufacturing the surface-treated sheet for an alkaline secondary battery according to claim 16, wherein a deposited amount of nickel in the nickel plating layer is 1.7 to 45.0 g/m².

20. The surface-treated sheet for an alkaline secondary battery according to claim 1, wherein the deposited amount of zinc is 0.5 to 5.5 g/m².

* * * * *